(12) United States Patent
Suzuki et al.

(10) Patent No.: US 10,867,174 B2
(45) Date of Patent: Dec. 15, 2020

(54) SYSTEM AND METHOD FOR TRACKING A FOCAL POINT FOR A HEAD MOUNTED DEVICE

(71) Applicant: Samsung Electronics Co., Ltd., Suwon-si (KR)

(72) Inventors: Masaki Suzuki, Sunnyvale, CA (US); Sergio Perdices-Gonzalez, Sunnyvale, CA (US); Pranav Mistry, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/128,322

(22) Filed: Sep. 11, 2018

(65) Prior Publication Data

US 2019/0244005 A1  Aug. 8, 2019

Related U.S. Application Data

(60) Provisional application No. 62/626,296, filed on Feb. 5, 2018.

(51) Int. Cl.
*G06K 9/00* (2006.01)
*G06F 3/01* (2006.01)
(Continued)

(52) U.S. Cl.
CPC .......... *G06K 9/0061* (2013.01); *G06F 3/013* (2013.01); *G06F 3/04815* (2013.01); *G06T 11/60* (2013.01)

(58) Field of Classification Search
None
See application file for complete search history.

(56) References Cited

U.S. PATENT DOCUMENTS 8,971,570 B1    3/2015  Raffle et al.
9,110,504 B2    8/2015  Lewis et al.
(Continued)

FOREIGN PATENT DOCUMENTS

JP    2000-249902 A    9/2000
KR    10-2010-0035742 A    4/2010
(Continued)

OTHER PUBLICATIONS

Konrad et al., "Optimizing Virtual Reality for all users through gaze-contingent and adaptive focus displays", PNAS, 2017. (Year: 2017).*

(Continued)

*Primary Examiner* — Nicholas R Wilson

(57) ABSTRACT

An electronic device, method, and computer readable medium for augmented reality system is provided. The electronic device includes a light source that emits a light towards an eye of a user of the device, an adjustable lens having an adjustable focal point, a light sensor, configured to detect a reflected light that is reflected from the eye of the user, a processor, and a display screen. The processor determines a first distance corresponding to a focal point of the eye based on one or more positions of the reflected light, and adjusts the focal point of the lens unit based on the focal point of the eye. The display screen is configured to present an image of the object at a second distance based on the focal point of the lens unit to create a perception for the user that the image is placed at the first distance.

20 Claims, 21 Drawing Sheets

(51) Int. Cl.
*G06F 3/0481* (2013.01)
*G06T 11/60* (2006.01)

(56) References Cited

U.S. PATENT DOCUMENTS

| | | | |
|---|---|---|---|
| 9,886,796 | B2 | 2/2018 | Kobayashi |
| 2010/0149073 | A1 | 6/2010 | Chaum et al. |
| 2011/0019874 | A1 | 1/2011 | Jarvenpaa et al. |
| 2011/0182472 | A1 | 7/2011 | Hansen |
| 2012/0154277 | A1 | 6/2012 | Bar-Zeev et al. |
| 2013/0050432 | A1 | 2/2013 | Perez et al. |
| 2015/0215412 | A1* | 7/2015 | Marvit .............. G06F 3/013 715/753 |
| 2016/0139411 | A1 | 5/2016 | Kang et al. |
| 2016/0150201 | A1 | 5/2016 | Kilcher et al. |
| 2016/0270655 | A1* | 9/2016 | Caraffi .............. A61B 3/113 |
| 2016/0363770 | A1 | 12/2016 | Kim et al. |
| 2016/0370605 | A1* | 12/2016 | Ain-Kedem ....... G02B 27/0172 |
| 2017/0115742 | A1 | 4/2017 | Xing et al. |
| 2017/0140224 | A1 | 5/2017 | Wilson et al. |
| 2017/0160798 | A1 | 6/2017 | Lanman et al. |
| 2017/0205876 | A1 | 7/2017 | Vidal et al. |
| 2017/0206713 | A1 | 7/2017 | Lo et al. |
| 2017/0263006 | A1 | 9/2017 | Hunt et al. |
| 2018/0003919 | A1 | 1/2018 | Song et al. |

FOREIGN PATENT DOCUMENTS

| | | |
|---|---|---|
| KR | 10-2012-0043980 A | 5/2012 |
| WO | 2013138647 A1 | 9/2013 |
| WO | 2016080708 A1 | 5/2016 |
| WO | 2016180702 A1 | 11/2016 |

OTHER PUBLICATIONS

Pieter Blignaut, "Mapping the pupil-Glint Vector to Gaze Coordinates in a Simple Video-Based Eye Tracker", 2014. (Year: 2014).*
Morimoto et al., "Eye Gaze Tracking Techniques for Interactive Applications", Elsevier, 2004. (Year: 2004).*
Itoh et al., "Monocular Focus Estimation Method fora Freely-Orienting Eye using Prukinje-Sanson Images", IEEE 2017. (Year: 2017).*
Lee et al. "3D Gaze Tracking Method Using Purkinje Images on Eye Optical Model and Pupil", Elsevier, 2011. (Year: 2011).*
Extended European Search Report regarding Application No. 19155363.5, dated Jun. 18, 2019, 8 pages.
International Search Report and Written Opinion regarding Application No. PCT/KR2019/001417, dated Jul. 2, 2019, 9 pages.
"WD-200A (operation model)", Brother Industries, Ltd., copyright 1995-2018, 6 pages. http://www.brother.co.jp/product/hmd/wd200a/index.aspx.

* cited by examiner

SYSTEM AND METHOD FOR TRACKING A FOCAL POINT FOR A HEAD MOUNTED DEVICE

CROSS-REFERENCE TO RELATED APPLICATION(S) AND CLAIM OF PRIORITY

This application claims priority under 35 U.S.C. § 119(e) to U.S. Provisional Patent Application No. 62/626,296 filed on Feb. 5, 2018 and entitled "Locating and Tracking User's Focal Point for Head Mounted Device". The above-identified provisional patent application is hereby incorporated by reference in its entirety.

TECHNICAL FIELD

This disclosure relates generally to optical head mounted display systems. More specifically, this disclosure relates to focal point tracking and gaze tracking for a head mounted display system.

BACKGROUND

Augmented reality (AR) glasses are a growing market. Current AR glasses only project the content at a fixed distance (usually infinity). Even though there are optical methods to change the focal plane, suitable methods and systems to track the user focal distance in a portable head-mounted AR system do not exist. That is, a current optical head-mounted display draws information at a fixed distance, while a user's focal distance varies. Therefore, if the eye does not focus at the focal distance, images will blur and may produce dizziness.

SUMMARY

This disclosure provides a system and method for focal point tracking for a head mounted display system.

In one embodiment, an electronic device is provided. The electronic device includes a light source configured to emit a light towards an eye of a user of the device, an adjustable lens having an adjustable focal point, a light sensor, coupled to the lens unit, configured to detect a reflected light that is reflected from the eye of the user, a processor, and a display screen. The processor is configured to determine a first distance corresponding to a focal point of the eye of the user based on one or more positions of the reflected light, and adjust the focal point of the lens unit based on the focal point of the eye. The display screen is configured to present an image of the object at a second distance based on the focal point of the lens unit to create a perception for the user that the object in image is placed at the first distance.

In another embodiment, a method is provided. The method comprises emitting, by a light source, a light towards an eye of the user. The method also comprises detecting a reflected light that is reflected from the eye of the user. The method also comprises determining a first distance corresponding to a focal point of the eye of the user based on one or more positions of the reflected light. The method also comprises adjusting the focal point of the lens unit based on the focal point of the eye. The method further comprises displaying an image of the object at a second distance based on the focal point of the lens unit to create a perception for the user that the image (in particular, the object in the image) is placed at the first distance.

In another embodiment, a non-transitory computer readable medium embodying a computer program for operating an electronic device including a memory and at least one processor is provided. The computer program comprises computer readable program code that, when executed by the at least one processor, causes the electronic device to emit, by a light source, a light towards an eye of a user of the device, detect a reflected light that is reflected from the eye of the user, determine a first distance corresponding to a focal point of the eye of the user based on one or more positions of the reflected light, adjust the focal point of the lens unit based on the focal point of the eye, and display an image of the object at a second distance based on the focal point of the lens unit to create a perception for the user that the image (for example, the object in the image) is placed at the first distance.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™ APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 31D, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

Figure 1:
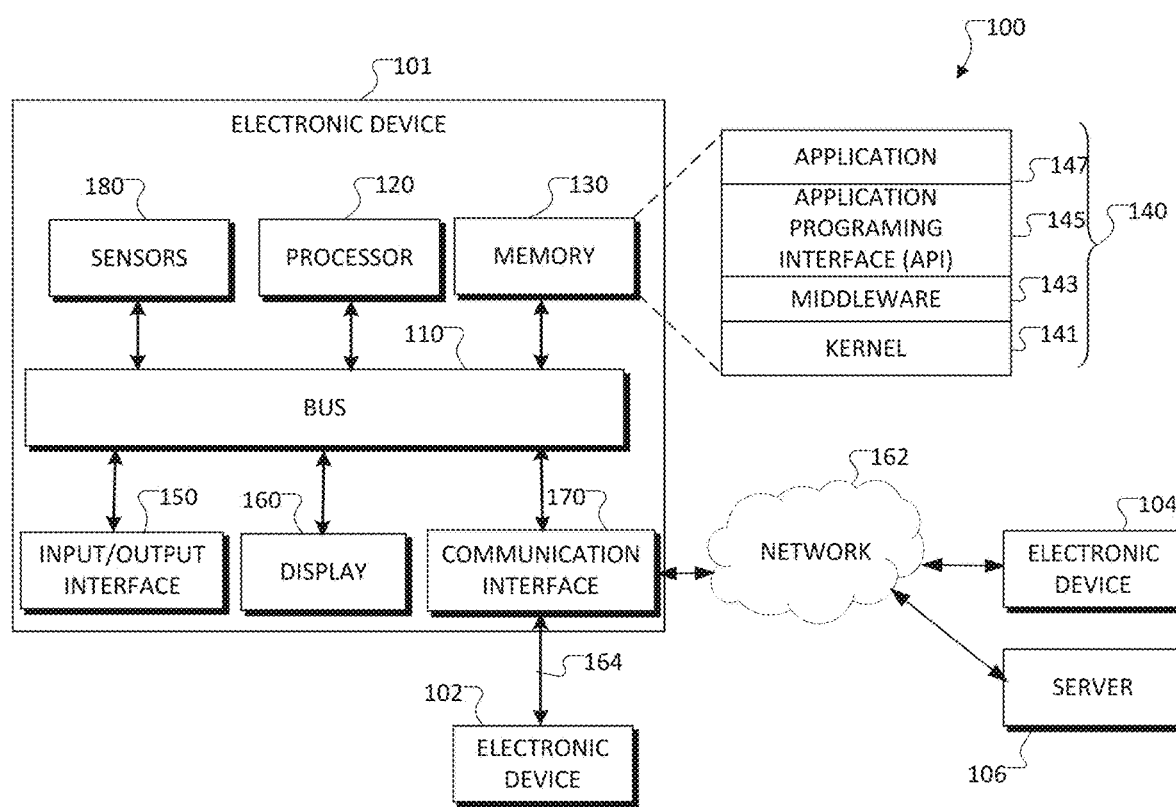
FIG. 1 illustrates an example of a network configuration according to an embodiment of this disclosure.

FIG. 1 illustrates an example network environment 100 according to various embodiments of the present disclosure. The embodiment of the network environment 100 shown in FIG. 1 is for illustration only. Other embodiments of the network environment 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (I/O) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. In various embodiments, the memory 130 can store spatial map data that can include mapping information of a real environment such as the interior of an office building, mall, house, amusement park, neighborhood or any other real world or virtual world mapping information utilized by an application 147 on the electronic device 101. According to an embodiment of the present disclosure, the memory 130 stores software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 can be located within the electronic device 101. A camera sensor 180 can capture a plurality of frames for a single image to be combined by the processor 120.

The first external electronic device 102 or the second external electronic device 104 can be a wearable device or an electronic device 101-mountable wearable device (e.g., an optical head mounted display (HMD)). When the electronic device 101 is mounted in a HMD (e.g., the electronic device 102), the electronic device 101 is able to detect the mounting in the HMD and operate in an augmented reality mode. In certain embodiments, the electronic device 101 is able to detect the mounting in the HMD and operate in an augmented reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

For example, the electronic device 101 can include an event processing module, such as within processor 120. The event processing module can process at least part of information obtained from other elements (e.g., the processor 120, the memory 130, the input/output interface 150, or the communication interface 170) and can provide the same to the user in various manners. The server event processing module can include at least one of the components of the event processing module and perform (or instead perform) at least one of the operations (or functions) conducted by the event processing module.

For example, according to an embodiment of the present disclosure, the event processing module processes information related to an event, which is generated while the electronic device 101 is mounted in a wearable device (e.g., the electronic device 102) to function as a display apparatus and to operate in the augmented reality mode, to fit the augmented reality mode and display the processed information. When the event generated while operating in the augmented reality mode is an event related to running an application, the event processing module can block the running of the application or process the application to operate as a background application or process. Additional information on the event processing module 185 may be provided through FIG. 2 described below.

The event processing module can be separate from the processor 120 or at least a portion of the event processing module can be included or implemented in the processor 120 or at least one other module, or the overall function of the event processing module can be included or implemented in the processor 120 shown or another processor. The event processing module can perform operations according to embodiments of the present disclosure in interoperation with at least one program 140 stored in the memory 130.

Figure 2:
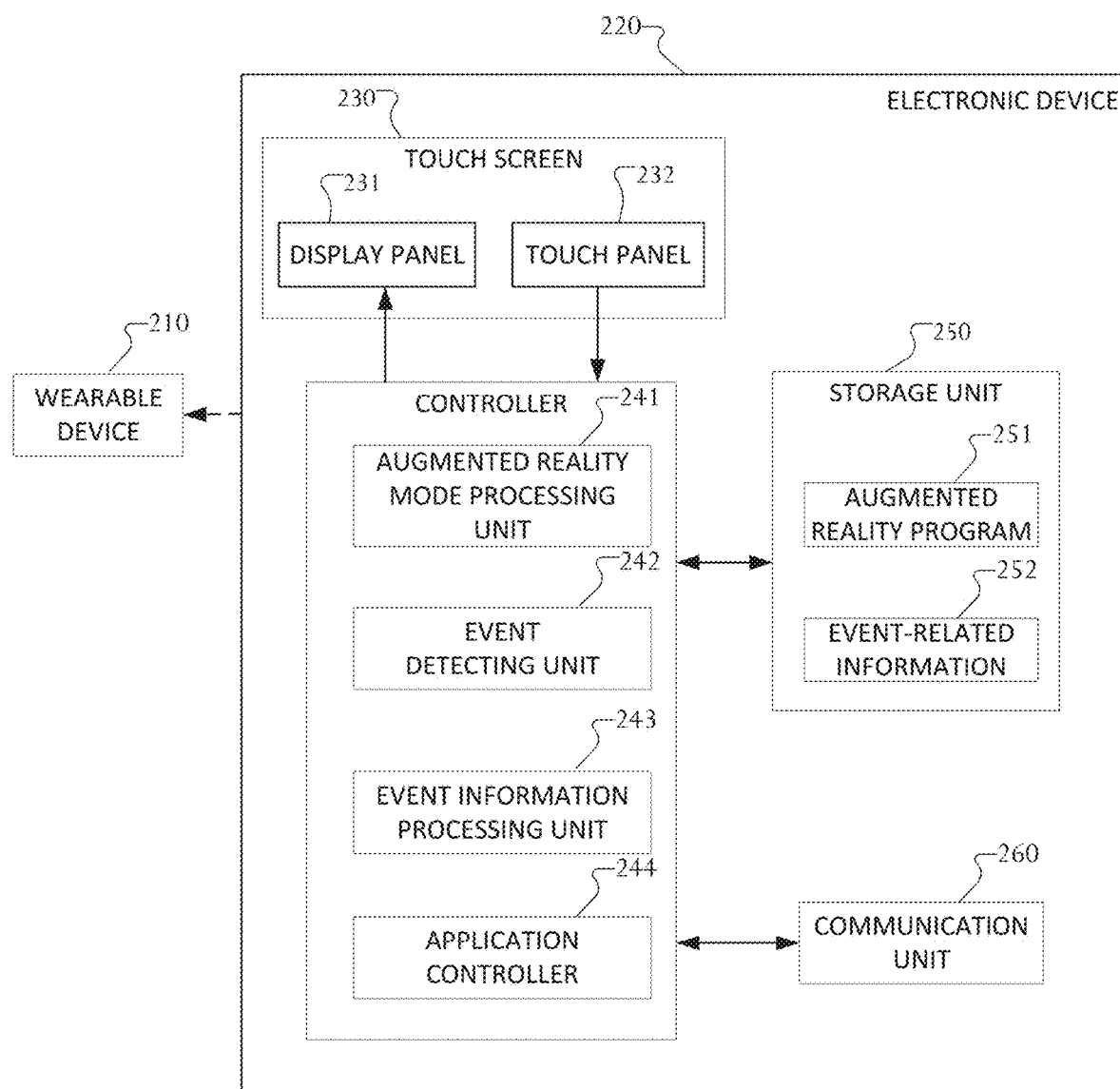
FIG. 2 is a block diagram of an example configuration of an electronic device according to an embodiment of this disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure. The electronic device 220 depicted in FIG. 2 can be configured the same as, or similar to, any of electronic devices 101, 102, or 104.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to certain embodiments, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event determining unit 242, an event information processing unit 243, or an application controller 244.

For example, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to certain embodiments, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments, when the electronic device 220 is operated in the augmented reality mode, the controller 240 can control the processing of information related to an event generated while operating in the augmented reality mode to fit in the augmented reality mode and display the processed information. According to certain embodiments, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to certain embodiments, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to certain embodiments, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 185 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231, but exclude the touch panel 232.

According to certain embodiments, the electronic device 220 can be denoted as a first device (or a first electronic device), and the wearable device 210 may be denoted as a second device (or a second electronic device) for ease of description.

According to certain embodiments, an electronic device can comprise a display unit displaying on a screen corresponding to an augmented reality mode and a controller performing control that detects an interrupt according to an occurrence of at least one event, that varies event-related information related to the event in a form corresponding to the augmented reality mode, and that displays the varied event-related information on the display screen that corresponds to the augmented reality mode.

According to certain embodiments, the event can include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to certain embodiments, the electronic device further comprises a storage unit configured for storing the event-related information when the event is not an event to be displayed in the augmented reality mode, wherein the controller can perform control to display the event-related information stored in the storage unit when the electronic device switches from the virtual reality mode into an augmented reality mode or a see-through (non-augmented reality) mode. According to certain embodiments, the electronic device can further comprise a storage unit that stores information regarding at least one event to be displayed in the augmented reality mode. According to certain embodiments, the event can include an instant message reception notification event. According to certain embodiments, when the event is an event related to running at least one application, the controller can perform control that blocks running of the application according to occurrence of the event. According to certain embodiments, the controller can perform control to run the blocked application when a screen mode of the electronic device switches from a virtual reality mode into an augmented reality mode or a see-through (non-augmented reality) mode. According to certain embodiments, when the event is an event related to running at least one application, the controller can perform control that enables the application, according to the occurrence of the event, to be run on a background of a screen of the augmented reality mode. According to certain embodiments, when the electronic device is connected with a wearable device, the controller can perform control to run the augmented reality mode. According to certain embodiments, the controller can enable the event-related information to be arranged and processed to be displayed in a three dimensional (3D) space of the augmented reality mode screen being displayed on a current display screen. According to certain embodiments, the electronic device 220 can include additional sensors such as one or more red, green, blue (RGB) cameras, dynamic vision sensor (DVS) cameras, 360 degree cameras, or a combination thereof.

Figure 3:
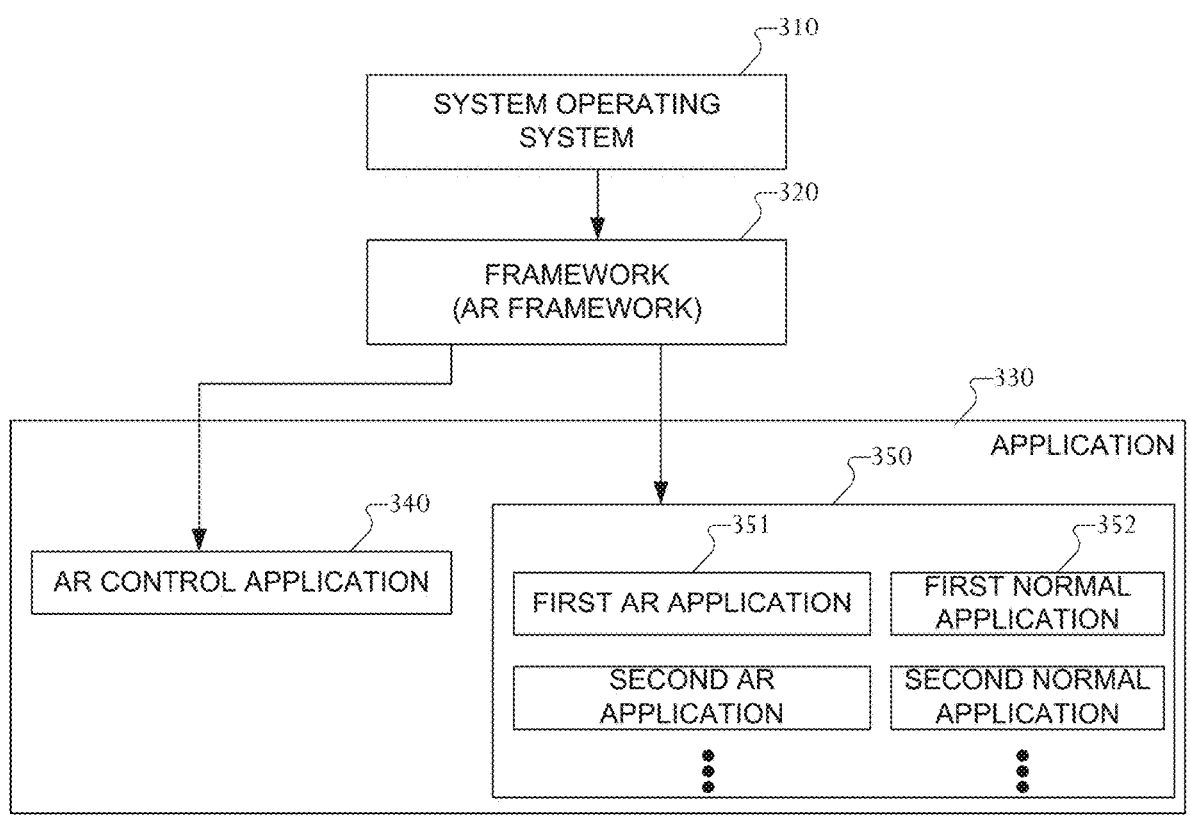
FIG. 3 is a block diagram that illustrates a program module according to an embodiment of this disclosure.
Figure 4A:
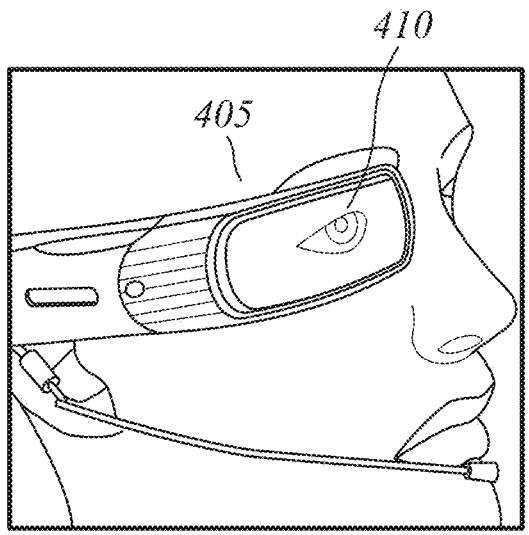
FIGS. 4A, 4B, 4C, and 4D illustrate examples of a head mounted display (HMD) for use in augmented reality, mixed reality, or virtual reality according to an embodiment of this disclosure.
Figure 4B:
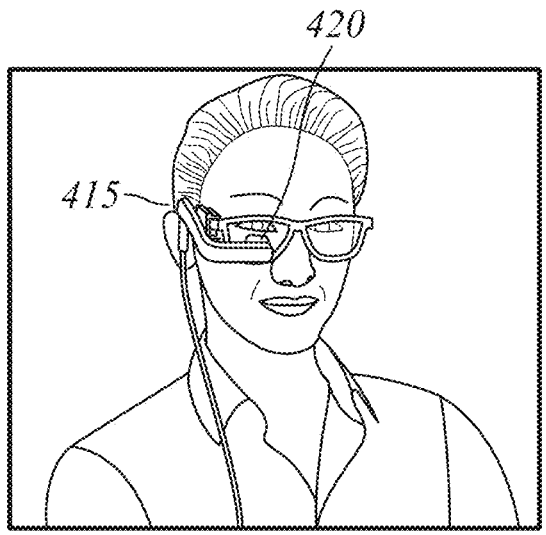
Figure 4C:
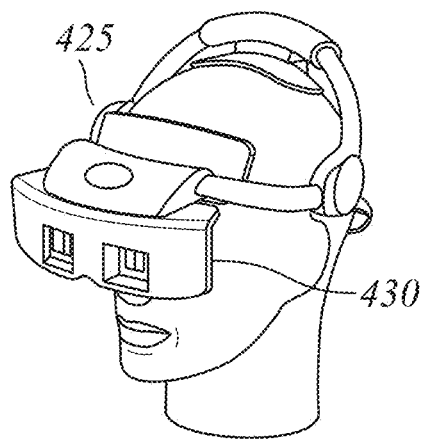
Figure 4D:
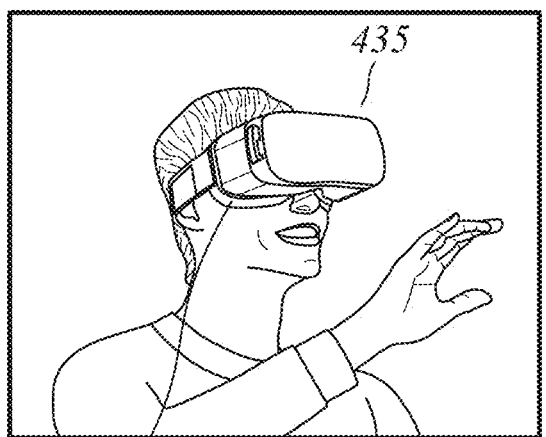

FIG. 3 is a block diagram illustrating a program module according to an embodiment of the present disclosure. The embodiment illustrated in FIG. 3 is for illustration only and other embodiments could be used without departing from the scope of the present disclosure. In the example shown in FIG. 3, although an augmented reality (AR) system is depicted, at least some embodiments of the present disclosure apply equally to a virtual reality (VR) and the augmented reality (AR). Referring to FIG. 3, the program module can include a system operating system (e.g., an OS) 310, a framework 320, and an application 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a Bluetooth driver, a shared memory driver, a USB driver, a keypad driver, a Wi-Fi driver, an audio driver, or an inter-process communication (IPC) driver.

According to certain embodiments, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 so as to provide the augmented reality mode on the electronic device.

The application 330 can include a plurality of applications and can include at least one AR application 351 running in the augmented reality mode and at least one normal application 352 running in a non-augmented reality mode, which is not the augmented reality mode.

The application 330 can further include an AR control application 340. An operation of the at least one AR application 351 and/or at least one normal application 352 can be controlled under the control of the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the non-augmented reality mode, but not in the augmented reality mode. When there is an application to be run in relation with the event occurring in the normal mode, the framework 320 can perform or provide control to run at least one normal application 352.

According to certain embodiments, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to certain embodiments, when an event occurs while operating in the augmented reality mode, the framework 320 can perform control to block the running of at least one normal application 352 related to the occurring event.

According to certain embodiments, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to certain embodiments, when an event occurs while operating in the augmented reality mode, the framework 320 can control the running of at least one normal application 352 related to the occurring event so that the at least one normal application 352 related to the event operates on the background so as not to influence the screen by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references AR, it can be applied to other scenarios such as mixed reality, or virtual reality etc. Collectively the various reality scenarios can be referenced herein as extended reality (XR).

Various examples of aspects of a user interface (UI) for XR scenarios. It should be noted that aspects of XR UIs disclosed herein are merely examples of XR UIs and are not intended to be limiting.

There are different types of display elements that can be used in XR scenarios. For example, displayed elements are either tied directly to the real world or tied loosely to the XR display space. In world elements are elements that move in relation to the real or virtual environment itself (i.e., move in relation to the environment itself). Depending on the object, in world elements may not necessarily move in relation to the user's head when wearing a head mounted display (HMD).

Heads up display (HUD) elements are elements wherein users can make small head movements to gaze or look directly at various application (app) elements without moving the HUD elements container or UI panel in the display view. HUD elements can be a status bar or UI by which information is visually displayed to the user as part of the display.

FIGS. 4A, 4B, 4C, and 4D illustrate examples of a head mounted display (HMD) for use in augmented reality, mixed reality, or virtual reality according to an embodiment of this disclosure. The embodiments of the HMDs shown in FIGS. 4A-4D are for illustration only and other configurations could be used without departing from the scope of the present disclosure.

The HMD can generate an augmented reality environment in which a real-world environment is rendered with augmented information. The HMD can be monocular or binocular and can be an opaque, transparent, semi-transparent or reflective device. For example, the HMD can be a monocular electronic device 405 having a transparent screen 410. A user is able to see through the screen 410 as well as able to see images rendered, projected or displayed on the screen 410. The images may be projected onto the screen 410, generated or rendered by the screen 410 or reflected on the screen 410. In certain embodiments, the HMD is a monocular electronic device 415 having an opaque or non-see through display 420. The non-see through display 420 can be a liquid crystal display (LCD), a Light emitting diode (LED), active-matrix organic light emitting diode (AMO-LED), or the like. The non-see through display 420 can be configured to render images for viewing by the user. In certain embodiments, the HMD can be a binocular electronic device 425 having a transparent screen 430. The transparent screen 430 can be a single contiguous screen, such as adapted to be viewed by, or traverse across, both eyes of the user. The transparent screen 430 also can be two transparent screens in when one screen is disposed corresponding to a respective eye of the user. The user is able to see through the screen 430 as well as able to see images rendered, projected or displayed on the screen 430. The images may be projected onto the screen 430, generated or rendered by the screen 430 or reflected on the screen 430. In certain embodiments, the HMD is a binocular electronic device 435 having an opaque or non-see through display 440. The HMD can include a camera or camera input configured to capture real-world information and display, via the non-see through display 440, real-world information. The non-see through display 440 can be an LCD, LED, AMOLED, or the like. The non-see through display 440 can be configured to render images for viewing by the user. The real-world information captured by the camera can be rendered as a video image on the display with augmented information.

Embodiments of the present disclosure relate to focal point tracking for use in augmented reality (AR) systems. In the recent years, a significant increase in interest in Augmented Reality (AR) glasses has been experienced. Because a monocular see-through AR HMD is compact and light-weight, demand is expected to continue and increase. A significant issue with the current technology is that AR HMDs may draw an extremely blurred image in some cases. The blurred image may cause nausea, dizziness or generally ill feelings in the user of the HMD.

Figure 5A:
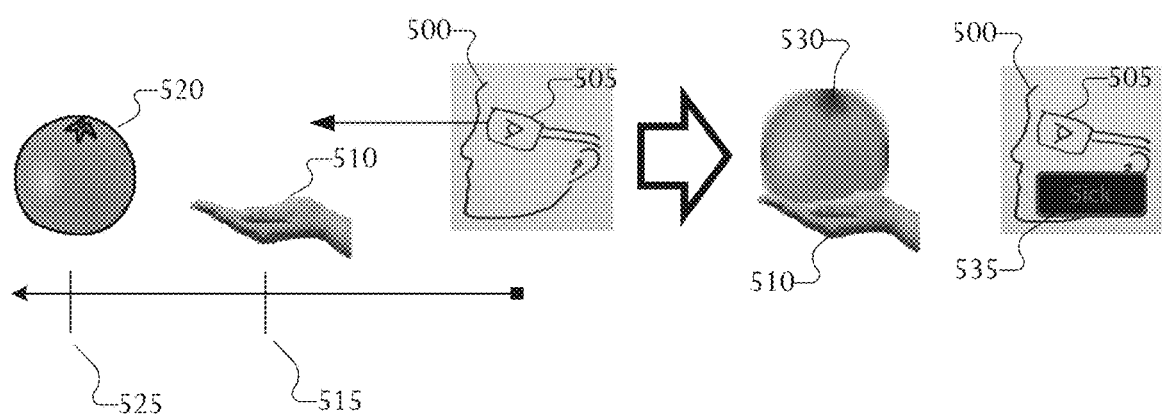
FIGS. 5A and 5B illustrate effects of focal point differences according to an embodiment of this disclosure.
Figure 5B:
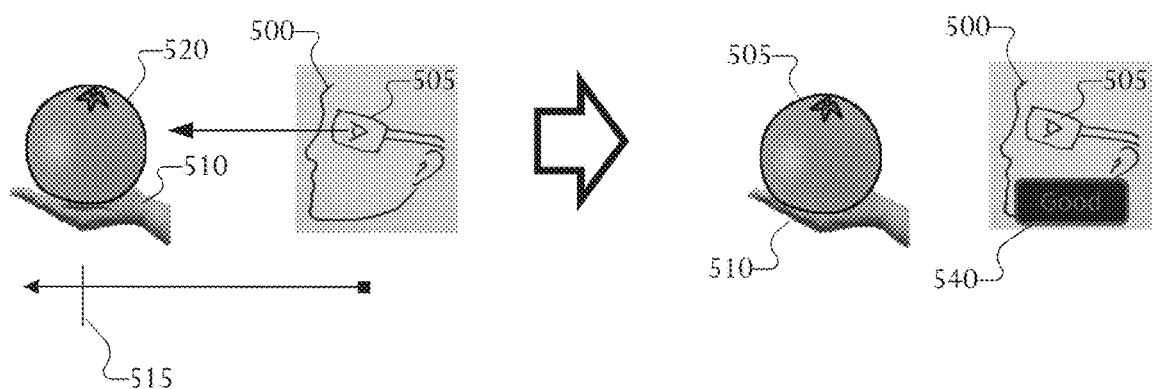

FIGS. 5A and 5B illustrate effects of focal point differences according to an embodiment of this disclosure. The embodiments shown in FIGS. 5A and 5B are for explanation only and other illustrations could be used without departing from the scope of the present disclosure.

Current optical head-mounted displays draw information at a fixed distance, while a user's focal distance varies. Therefore, if the eye does not focus at the focal distance, images will blur and may produce dizziness. For example, a user 500 may choose to operate an HMD 505 for an AR experience. The user 500 is able to view, through a display of the HMD 505, their hand 510 at a first distance 515. The user 500 may wish to see an object 520, such as an image of an orange, displayed on their hand 515.

If the HMD 505 renders the object 520 at a second distance 525, then the user 500 may perceive a blurred object 530 and a sharp, clear, or focused, hand 510 because the focus of the user 500 is on the hand 510. The difference between the focal-points may result in the user experiences dizziness, nausea or other ill feelings 535.

In contrast, if the HMD 505 renders the object 520 at the first distance 525, then the user 500 may perceive the object 525 clearly, as well as perceiving a sharp, clear, or focused, hand 510. Because no difference in focal-points exists (or the difference is negligible or insignificant), the user feels well 540 and does not experience dizziness, nausea or other ill feelings.

Embodiments of the present disclosure provide for real time user focal point tracking to project contents at the user's focal point. Embodiments of the present disclosure are configured to estimate a user's current focal point as a function of lights reflected from a cornea and lens of the user's eye. Embodiments of the present disclosure use lights reflected from a cornea and lens of the user's eye to estimate the user's focal point.

Figure 6A:
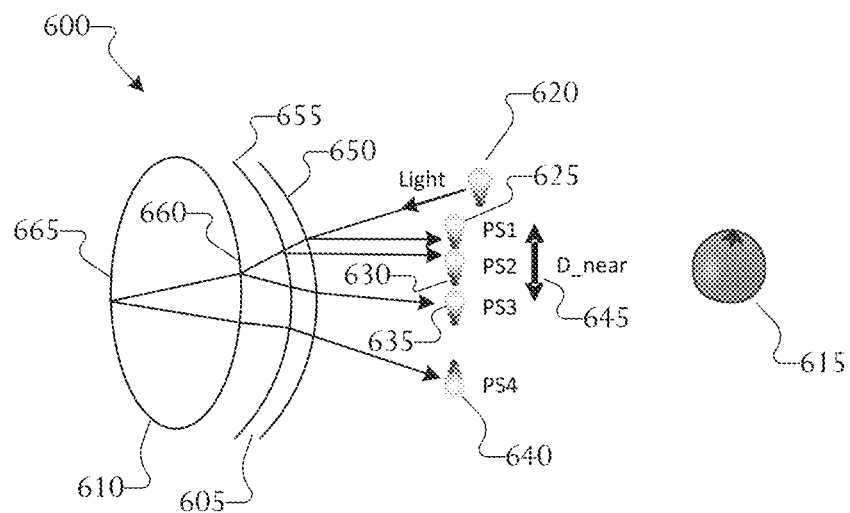
FIGS. 6A and 6B illustrate Purkinje-Sanson Image estimation according to embodiments of the present disclosure.
Figure 6B:
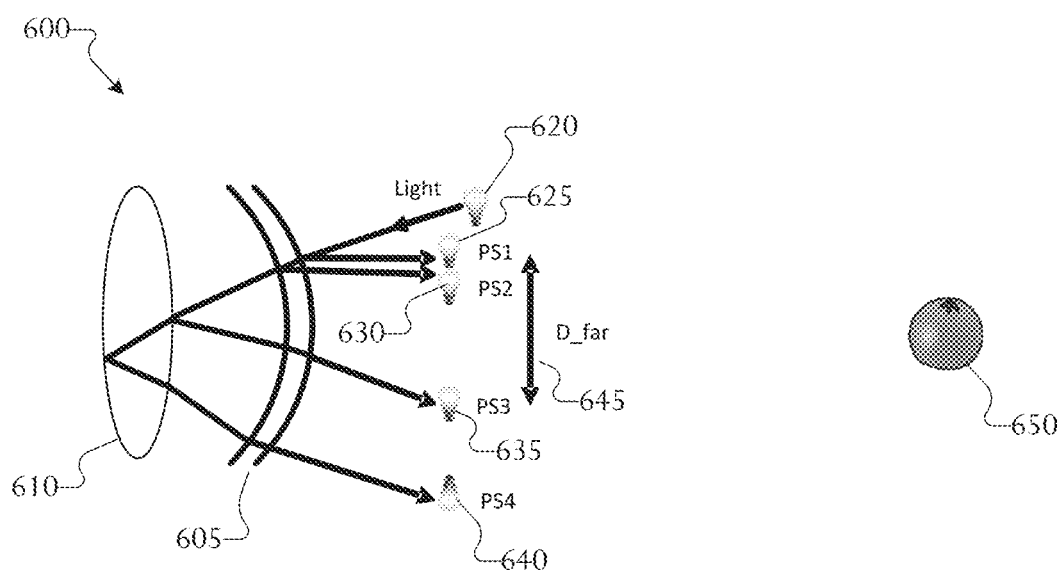

FIGS. 6A and 6B illustrate Purkinje-Sanson Image estimation according to embodiments of the present disclosure. The embodiment of the estimation 600 shown in FIGS. 6A and 6B is for illustration only and other estimation methods could be used without departing from the scope of the present disclosure. The example shown in FIG. 6A illustrates a near focus while the example shown in FIG. 6B illustrates a far focus.

Certain embodiments of the present disclosure use Purkinje-Sanson Image estimation 600 to estimate a focal point of the user. The user's eye includes a cornea 605 and a lens 610. A thickness and shape of the cornea 605 and lens 610 vary based on a change in focal point of the user. In the example shown in FIG. 6A, when a user is looking at a near object 615, light emitted from light source 620 is reflected by the cornea 605 and lens 610. Because the user has a near focal point, the shape of the lens 610 and cornea 605 adjust and, in response, the light is reflected by the cornea 605 and lens 610 at a first reflection point PS1 625, a second reflection point PS2 630, a third reflection point PS3 635 and a fourth, inverted reflection point PS4 640. The first reflection point PS1 625 corresponds to light reflected from an anterior (or outer) surface 650 of the cornea 605; second reflection point PS2 630 corresponds to light reflected from an posterior (or inner) surface 655 of the cornea 605; third reflection point PS3 635 corresponds to light reflected from an anterior (or outer) surface 660 of the lens 610; and fourth reflection point PS2 640 corresponds to light reflected from an posterior (or inner) surface 665 of the lens 610.

A distance 645 between PS1 625*a* and PS3 635*a* indicates a thickness of the lens 610. In the example shown in FIG. 6B, when a user is looking at a far object 615, light emitted from the light source 620 is again reflected by the cornea 605 and lens 610. Because the user has a far focal point, the shape of the lens 610 and cornea 605 adjust and, in response, the light is reflected to different points. That is, the light is reflected by the cornea 605 and lens 610 at the first reflection point PS1 625, the second reflection point PS2 630, the third reflection point PS3 635 and the fourth, inverted reflection point PS4 640. As shown in the examples in FIGS. 6A and 6B, the distance 645 between PS1 625 and PS3 635 changes. That is, the distance 645 increases as the user shifts their focal point from near object 615 to far object 650. Accordingly, the distance 645 between PS1 625 and PS3 635 indicates a lens 610 thickness of the user's eye.

Figure 7:
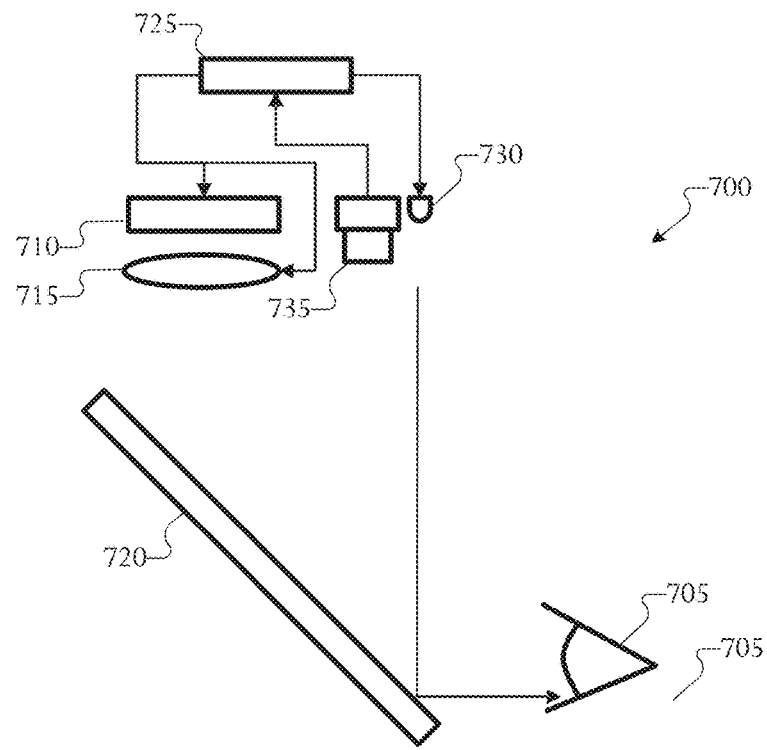
FIG. 7 illustrates a focal point estimation system according to embodiments of the present disclosure.

FIG. 7 illustrates a focal point estimation system according to embodiments of the present disclosure. The embodiment of the focal point estimation system (FPES) 700 is for illustration only and other embodiments could be used without departing from the scope of the present disclosure. The FPES 700 can be used with an HMD. The FPES 700 can be included as a component of an HMD. The FPES 700 can be removably coupled to the HMD. The HMD can be configured as one of the HMD's 405, 415, 425 or 440.

The FPES 700 is positioned in relation to the user's eye 705. The FPES 700 is able to emit a light towards the user's eye 705 and detect a reflected light from the user's eye 705. That is, the FPES 700 can emit a light towards the user's eye 705 while the user, being a wearer of the HMD, is looking at an object placed in front of the HMD, wherein the reflected light is reflected by an anterior surface of the eye of the user and inner lens of the eye of the user. The FPES includes OLED display 710, a lens assembly 715, a reflective interface 720, a processing system 725, an infrared light source 730, and an infrared camera 735.

The OLE display 710 displays images, such as images to augment a reality view of the user when wearing the HMD. In certain embodiments, the OLE display 710 can be integrated into the FPES 700, such as when the FPES 700 is part of, or comprises, the HMD. In certain embodiments, the OLE display 710 is part of the HMD and interacts with the FPES 700. For example, the FPES 700 can drive command signals to control an image rendered by the OLE display 710 and the OLE display 710 can render images based on estimations performed by the FPES 700. That is, the OLE display is configured to present an image of the object at a 2nd distance based on the focal point of the lens unit to create a perception for the user that the image is placed at the 1st distance.

The lens assembly 715 can include a single lens or a plurality of lenses. The lens assembly 715 can be a part of the OLE display 710 or coupled to the OLE display 710. For example, when the FPES is included with the HMD, the lens assembly 715 can be disposed in proximity to or over a display surface of the OLE display 710. In certain embodiments, when the FPES 700 is coupled to the HMD, the lens assembly 715 may be included as part of the HMD, may be included as part of the OLE display 710, or may be configured to removably couple to the HMD or OLE display 710, such that the lens assembly 715 is disposed in proximity to or over a display surface of the OLE display 710. The lens assembly 715 is configured to adjust to vary a focal point of the lens assembly 715.

The reflective interface 720 is a transparent, semi-transparent, or opaque material. The reflective interface 720 includes a reflective surface. For example, the reflective interface 720 can be a transparent mirror. In certain embodiments, the reflective interface 720 is integrated as part of the FPES 700. In certain embodiments, the reflective interface 720 is part of the HMD 700 to which the FPES 700 is coupled. The reflective interface 720 is configured to reflect light from the infrared light source 730 towards the eye 705 and reflect light from the eye 705 towards the infrared camera 735.

The infrared light source 730 emits an infrared light towards the reflective interface 720. The infrared light is emitted at a radiant intensity sufficiently low to be safe for the eye 705. A standard IEC-2471 describes a safe level of infrared's intensity, for example, a radiant intensity of 0.18 watt per steradian (W/sr). In certain embodiments, the infrared light source 730 emits the infrared light at or below 0.18 W/sr. In certain embodiments, the infrared light source 730 emits the infrared light at or below 0.10 W/sr. In certain embodiments, the infrared light source 730 includes a switcher configured to enable the infrared light source 730 to emit the infrared light at or below 0.01 W/sr. In certain embodiments, the illuminance of the light source 730 is 100% while the illuminance of PS1 625 is 2.5% with a magnification of 0.072; the illuminance of PS2 630 is 0.02% with a magnification of 0.06, the illuminance of PS3 635 is 0.09% with a magnification of 0.086; and the illuminance of PS4 640 is 0.09% with a magnification of 0.05. It is further noted that the image at PS4 is inverted (i.e., flipped) from the image at the light source.

The infrared camera 735 is configured to capture an image of the eye 705. The infrared camera 735 can detect light reflected from the eye 705. In certain embodiments, the infrared camera 735 can be, or can include, a light sensor configured to detect a reflected light. The reflected light can be reflected by an anterior surface of the eye of the user and inner lens of the eye of the user. The reflected light can be further reflected by reflective interface 720. The infrared camera 735 transmits signals corresponding to the detected or captures images to the processing system 725.

The processing system 725 can include one or more processors configured to control operations of the FPES 700, the HMD, or a combination thereof. The processing system 725 can include a memory to store instructions for operating the processing system 725, operating the FPES 700, operating the HMD, or a combination thereof. The memory also can store data captured by the FPES 700, such as via the infrared camera 735. The processing system 725 receives signals from the infrared camera 735 corresponding to the images of the eye 705. The processing system 725 analyzes a reflected light pattern on the eye 705 and estimates a corresponding focal point for the eye 705. For example, the processing system 725 can estimate a focal point of the eye 705 using a Purkinje-Sanson Image estimation method, such as illustrated in FIGS. 6A and 6B. The processing system 725 analyzes a reflection pattern in the image of the eye 705 as captured by infrared camera 735. The processing system 725 identifies reflection points corresponding to the reflection point PS1 625, the second reflection point PS2 630, the third reflection point PS3 635 and the fourth, inverted reflection point PS4 640. The processing system 725 calculates, measures, or otherwise determines a distance 645 between PS1 625 and PS3 635. The measurements vary based on eye rotation and anterior surface curvature of the eye of the user and the inner lens of the eye of the user while the user is looking at the object. Based on the distance 645 determination, the processing system 725 adjusts a focal point of the lens assembly 715. As such, the processing system 725 is configured to adjust the focal point of the lens unit in response to a 1st distance of the object from the HMD, wherein the 1st distance is determined based on position of the reflected light.

In response to the adjustment of the focal point of the lens assembly 715, the OLED display 710 is able to present an image of an object at a second distance based on the focal point of the lens assembly 715. Therefore, the FPES 700 is able to create a perception for the user that the image (or the object in the image) is at a first distance, which is different than the second distance.

In certain embodiments, the FPES 700 is configured to adjust for different interpupillary distances (IPDs). The FPES 700 can automatically, i.e., without user intervention, mechanically move an illumination LED using camera feedback loop to initially adjust and track user changes in HMD positioning during use and to adjust for different eye positions for different users. The FPES 700 can automatically, i.e., without user intervention, mechanically move the half-mirror (reflective interface 720), using camera feedback loop to initially adjust and track user changes in HMD positioning during use and to adjust for different eye positions for different users. In certain embodiments, the FPES 700 includes a Multi-LED: array (1D) or matrix (2D). The FPES 700 can perform feedback loop testing of different LED's and camera tracking of PS3 635. The FPES 700 can perform feedback loop optimization for once it is locked at the optimal LED can skip the loop or just track neighbor LEDs. In certain embodiments, the FPES 700 is configured to initially calibrate to a respective user and, thereafter, adjust a focal point based on user eye movements and adjustments in focus. In certain embodiments, the FPES 700 is configured to recalibrate in response to HMD movements of the user. Additionally or alternatively, in certain embodiments, the FPES 700 can be configured to adjust for different interpupillary distances (IPDs) based on manual user input/adjustment. In certain embodiments, feedback for the manual user input/adjustment can be provided to the user visually, haptically, and/or acoustically, etc.

Figure 8:
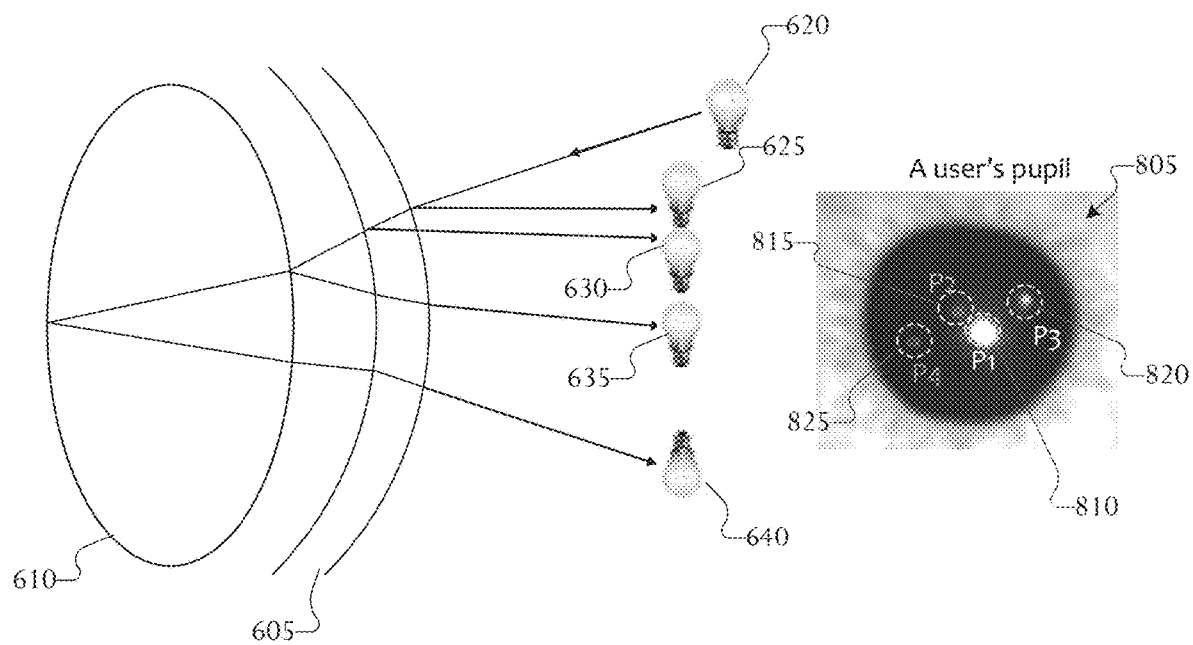
FIG. 8 illustrates a filtering operation of a focal point estimation system according to embodiments of the present disclosure.

FIG. 8 illustrates a filtering operation of a focal point estimation system according to embodiments of the present disclosure. The embodiment of the filtering operation shown in FIG. 8 is for illustration only. Other embodiments could be used without departing from the scope of the present disclosure.

The FPES 700 is configured to emit an infrared light towards a human eye and detect one or more reflection points in the user's pupil 805. The processing system 725 analyzes an image of the pupil 805, such as captured by infrared camera 735. The processing system 725 detects a first reflection point P1 810 corresponding to PS1 625, a second reflection point P2 815 corresponding to PS2 630, a third reflection point P3 820 corresponding to PS3 635, and a fourth reflection point P4 825 corresponding to point PS4 640. In certain embodiments, the processing system 725 identifies the first reflection point P1 810 and the third reflection point P3 815 and filters the remaining reflection points P2 815 and P4 825. Thereafter, the processing system 725 is configured to determine a distance between PS1 810 and PS3 820 and track changes in the location of PS1 810 and PS3 820 and the distance between PS1 810 and PS3 820.

Figure 9:
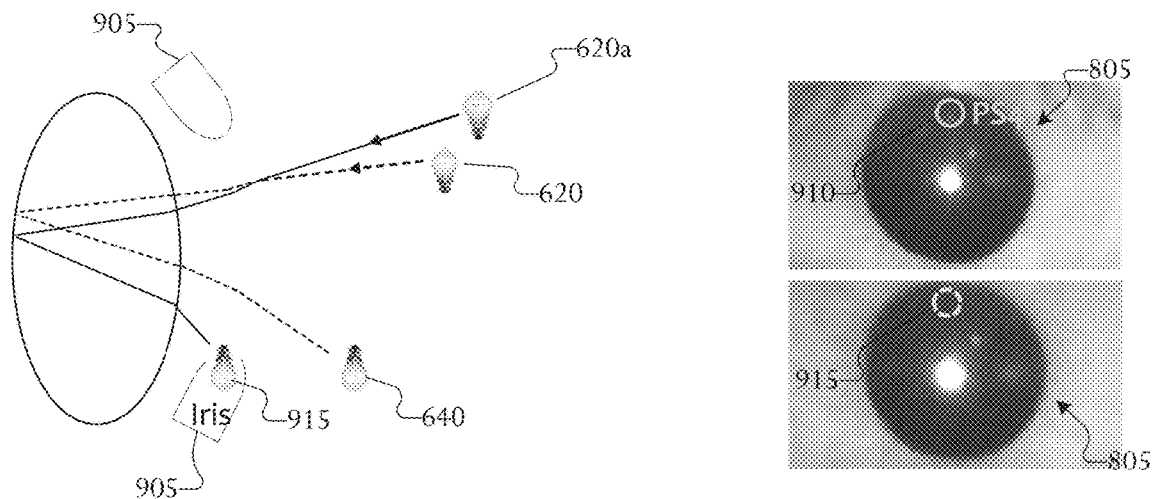
FIG. 9 illustrates an example reflection point determination in which a fourth reflection point is blocked according to embodiments of the present disclosure.

FIG. 9 illustrates an example reflection point determination in which a fourth reflection point is blocked according to embodiments of the present disclosure. The embodiment of reflection point determination shown in FIG. 9 is for illustration only. Other embodiments could be used without departing from the scope of the present disclosure.

In certain configurations, the FPES 700 can be configured such that the fourth reflection point PS4 640 is obscured, obstructed, or blocked by the iris 905 of the eye 705. For example, light emitted from light source 620 is initially reflected such that the fourth reflection point PS4 640 is detectable at reflection position PS4 910. The FPES 700 is configured to filter PS4 640 to be blocked by iris 905 such that PS4 640 is not present 915 in the pupil 805. Accordingly, to calibrate the FPES 700 properly to the user's eye, the light source 620 is adjusted to new light source position 620a. With light emitted at the new light source position 620a, the fourth reflection point PS4 640 is not detectable, not present 915, within the pupil 805.

Figure 10A:
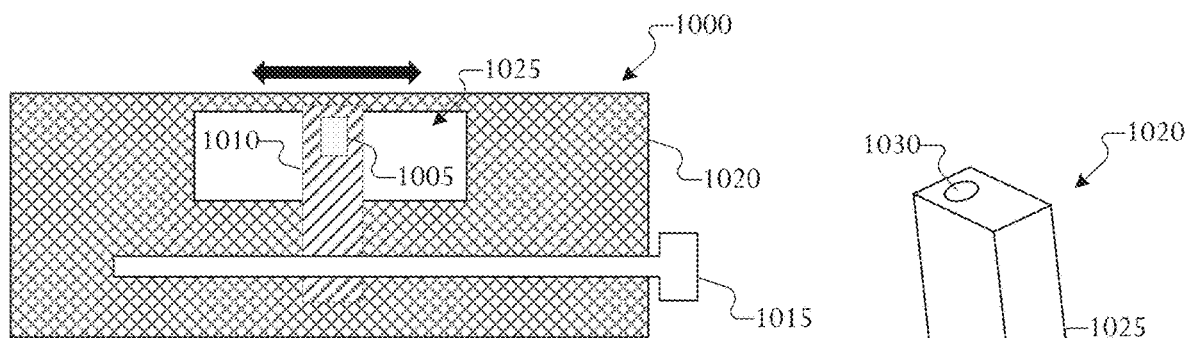
FIGS. 10A, 10B, and 10C illustrate an LED adjuster according to embodiments of the present disclosure.
Figure 10B:
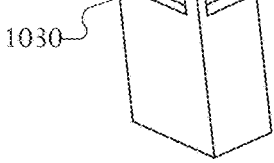
Figure 10C:
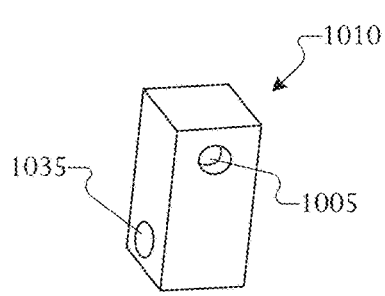

FIGS. 10A, 10B, and 10C illustrate an LED adjuster according to embodiments of the present disclosure. The embodiments of the LED adjuster 1000 shown in FIGS. 10A-10C are for illustration only and other embodiments could be used without departing from the scope of the present disclosure.

In certain embodiments, the FPES 700 includes an LED adjuster 1000. The LED adjuster 1000 is configured to vary a position of a light source of the FPES 700. In the example shown in FIGS. 10A-10C, the adjuster 1000 includes one or more LEDs 1005, an LED post 1010, an adjustment arm 1015, and a base 1020. The base 1020 is configured to contain the LED post 1010 within a window 1025. The adjustment arm 1015 traverses through a channel 1030 in the base 1020 and is coupled to the LED post 1010 through adjustment channel 1035. The adjustment arm 1015 can couple to the LED post 1010 via a threaded connection in the adjustment channel 1035 or any suitable means to mechanically vary a position of the LED post 1010 within the window 1025. The LED post 1010 is configured to hold one or more LEDs 1005 within a housing or on a surface thereof.

The LED adjuster 1000 is configured to vary a position of the LEDs 1005 to configure the FPES 700. For example, the adjustment arm 1015 can be rotated to vary a position of the LED post 1010 and respective LEDs 1005 to block PS4 640 by the iris 905.

Figure 11A:
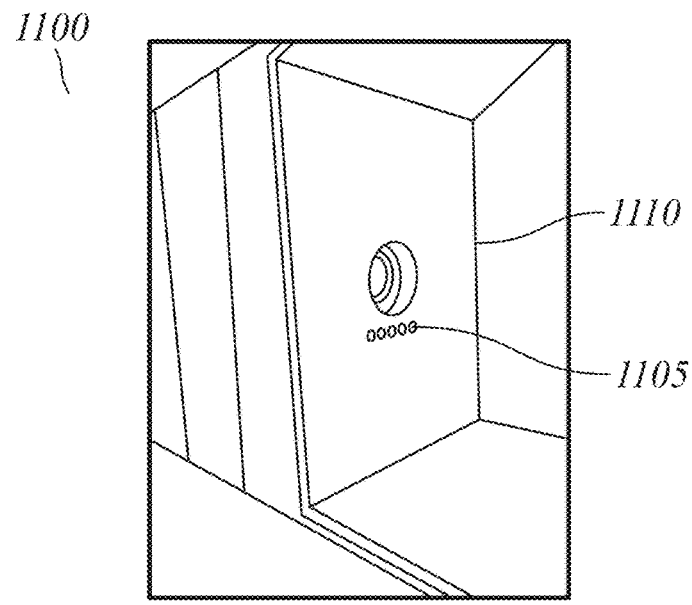
FIGS. 11A, 11B, and 11C illustrate a multi-LED adjuster according to embodiments of the present disclosure.
Figure 11B:
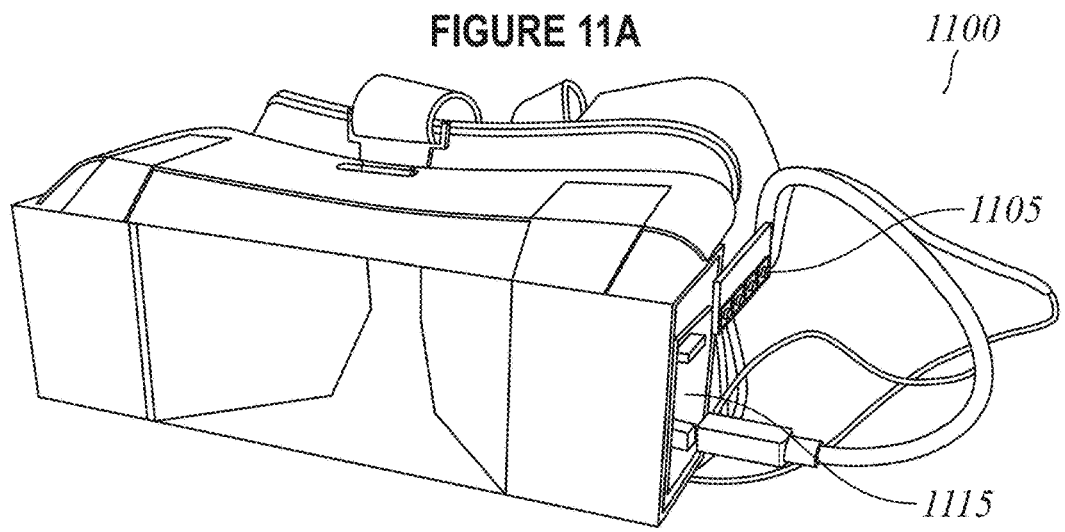
Figure 11C:
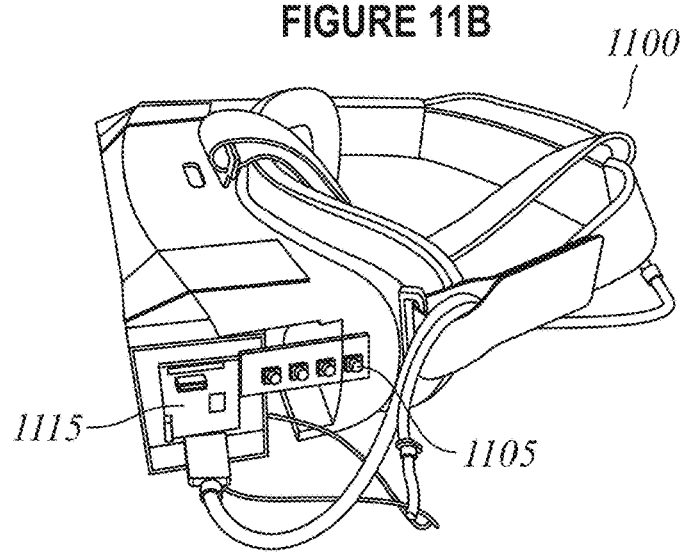

FIGS. 11A, 11B, and 11C illustrate a multi-LED adjuster according to embodiments of the present disclosure. The embodiments of the multi-LED adjuster 1100 shown in FIGS. 11A-11C are for illustration only and other embodiments could be used without departing from the scope of the present disclosure.

In certain embodiments, the FPES 700 includes a multi-LED adjuster 1100. The multi-LED adjuster 1100 is configured to vary a position of a light source of the FPES 700 by emitting light from different LEDs disposed in different positions. In the example shown in FIGS. 11A-10C, the multi-LED adjuster 1100 includes four LEDs 1105, although embodiments of the multi-LED adjuster 1100 can include more or less than four LEDs. The LEDs 1105 can be supported in specified positions by a housing 1110 of the FPES 700. A processor 1115 or processing circuitry is configured to operate the LEDs 1105 to vary a position of a light source. By varying which one of the LEDs 1105 is operated, i.e., illuminates or emits light, the multi-LED adjuster 1100 is able to configure the FPES 700. For example, the processor 1105 can operate different ones of the LEDs 1105 in order to block PS4 640 by the iris 905.

Figure 12:
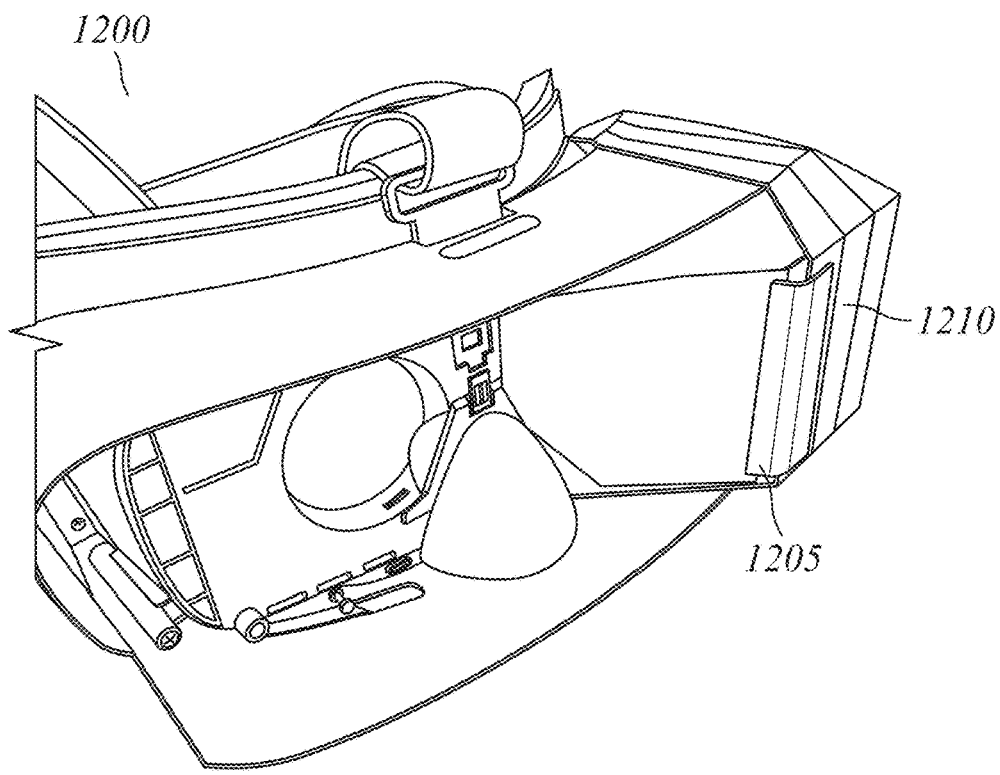
FIG. 12 illustrates a mirror adjuster according to embodiments of the present disclosure.

FIG. 12 illustrates a mirror adjuster according to embodiments of the present disclosure. The embodiment of the mirror adjuster 1200 shown in FIG. 12 is for illustration only and other embodiments could be used without departing from the scope of the present disclosure.

In certain embodiments, the FPES 700 includes a mirror adjuster 1200. The mirror adjuster 1200 is configured to vary a position of a light source of the FPES 700 by adjusting an angle of incidence (angle of reflection) of the mirror to reflect the light to different positions of the eye. The mirror adjuster 1200 includes a mirror 1205 configured to rotate or adjust. In certain embodiments, the mirror 1205 is coupled to the FPES 700 via one or more adjustment means, such as servos, actuators, pneumatics, magnets, electromagnets, snaps, clips or any other me suitable coupling or mechanically rotating mechanisms. The mirror 1205 can be supported in specified positions by a housing 1210 of the FPES 700. In certain embodiments, a processor or processing circuitry is configured to the adjustment means to vary a position an orientation of the mirror 1205 to adjust an angle of reflection of the light. By varying the orientation of the mirror 1205, the mirror adjuster 1200 is able to configure the FPES 700 in order to block PS4 640 by the iris 905.

Figure 13:
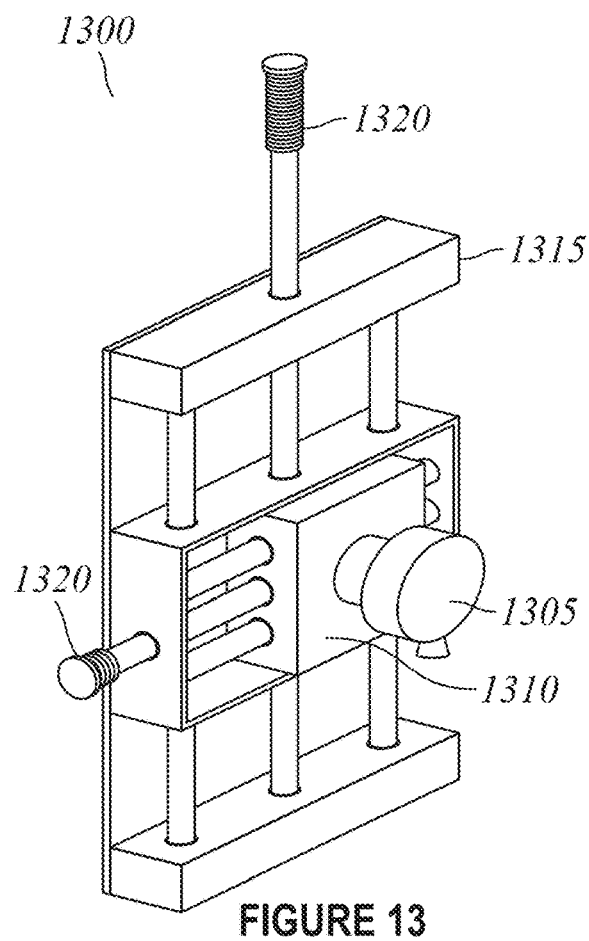
FIG. 13 illustrates a camera position adjuster according to embodiments of the present disclosure.

FIG. 13 illustrates a camera position adjuster according to embodiments of the present disclosure. The embodiment of the camera position adjuster 1300 shown in FIG. 13 is for illustration only and other embodiments could be used without departing from the scope of the present disclosure.

In certain embodiments, the FPES 700 includes a camera position adjuster 1300. The camera position adjuster 1300 is configured to vary a position of one or more of a camera or a light source of the FPES 700 by varying a position of the camera. In the example shown in FIG. 13, the camera adjuster 1300 includes a camera 1305 and one or more LEDs 1310, although embodiments of the camera adjuster 1300 can include only the camera 1305 without the LEDs 130. The camera 1305 can be supported in specified positions by a position adjuster 1315, which can be a frame assembly or a plurality of mechanical roads, gears, actuators, servos, magnets, and the like. The position adjuster 1315 can include one or more adjustment rods 1320 that are configured to vary a location of the camera 1305 vertically and horizontally. A processor or processing circuitry is configured to operate the position adjuster 1315 to vary a position of camera 1305. By varying the position of the camera 1305, the camera 1305 is able to configure the FPES 700 such at, at the adjusted position, the camera 1305 is unable to detect PS4 640 due to PS4 640 being blocked by the iris 905.

Figure 14A:
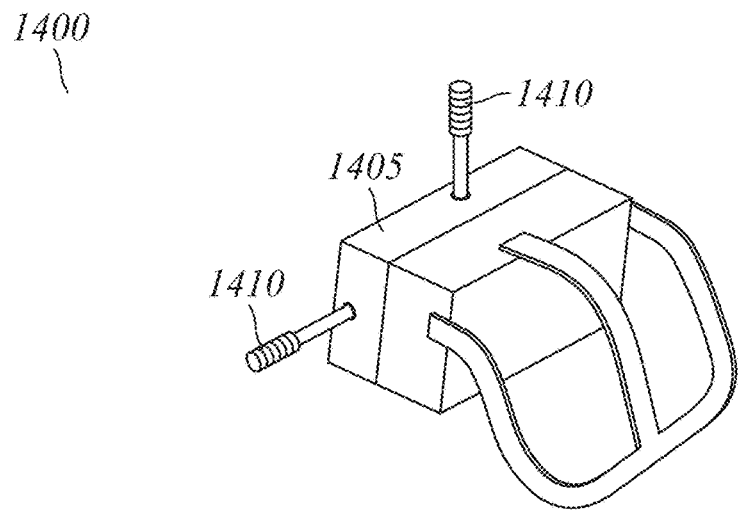
FIGS. 14A, 14B, and 14C illustrate an HMD position adjuster according to embodiments of the present disclosure.
Figure 14B:
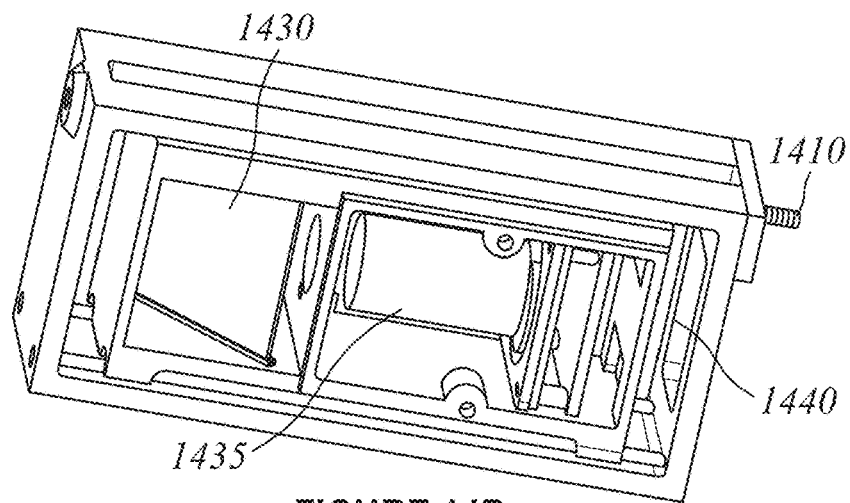
Figure 14C:
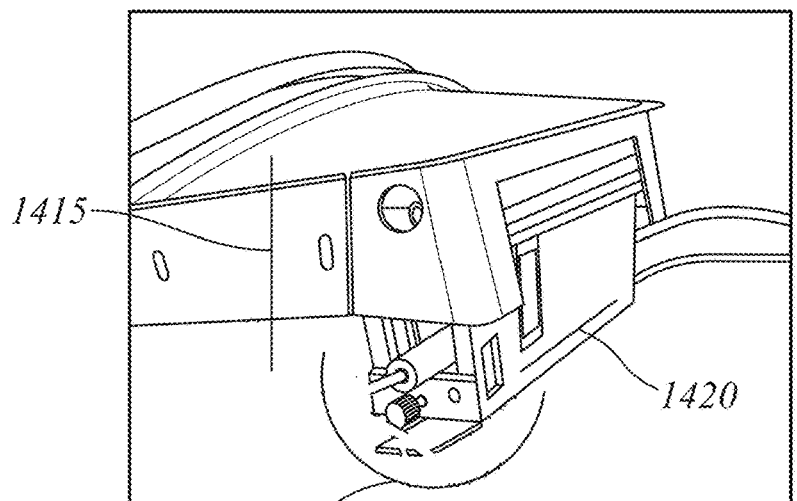

FIGS. 14A, 14B, and 14C illustrate an HMD position adjuster according to embodiments of the present disclosure. The embodiments of the HMD position adjuster 1400 shown in FIGS. 14A-14C are for illustration only and other embodiments could be used without departing from the scope of the present disclosure.

In certain embodiments, the FPES 700 includes an HMD position adjuster 1400. The HMD position adjuster 1400 is configured to vary a position of the entire HMD, including a camera, a light source, and display, by varying a position of the HMD 1405 in relation to a wearer (i.e., user) of the HMD. The HMD position adjuster 1400 includes can include one or more adjustment rods 1410 that are configured to vary a location of the camera 1305 vertically 1415, horizontally 1420 or rotate 1425 an angle of the HMD 1405. In certain embodiments, one or more of the adjustment rods 1410 is configured to vary a distance between the wearer's eyes and the HMD 1405, including the camera, light source, and display. In certain embodiments, the adjustment rods 1410 are configured to vary a distance between the mirror 1430 and one or more of the display, the camera 1435, and the light source. In certain embodiments, the adjustment rods 1410 are coupled to the HMD 1405 via one or more of: a plurality of mechanical roads, gears, actuators, servos, magnets, and the like. A processor 1440 or processing circuitry is configured to operate the adjustment rods 1410 to vary a position of the HMD 1405. By varying the position of the HMD 1405, the HMD position adjuster 1400 is able to configure the FPES 700. For example, by adjusting the HMD 1405, the angle of reflection from the light source to the eye and back to the camber is such at, at the adjusted position, the camera 1305 is unable to detect PS4 640 due to PS4 640 being blocked by the iris 905.

Figure 15:
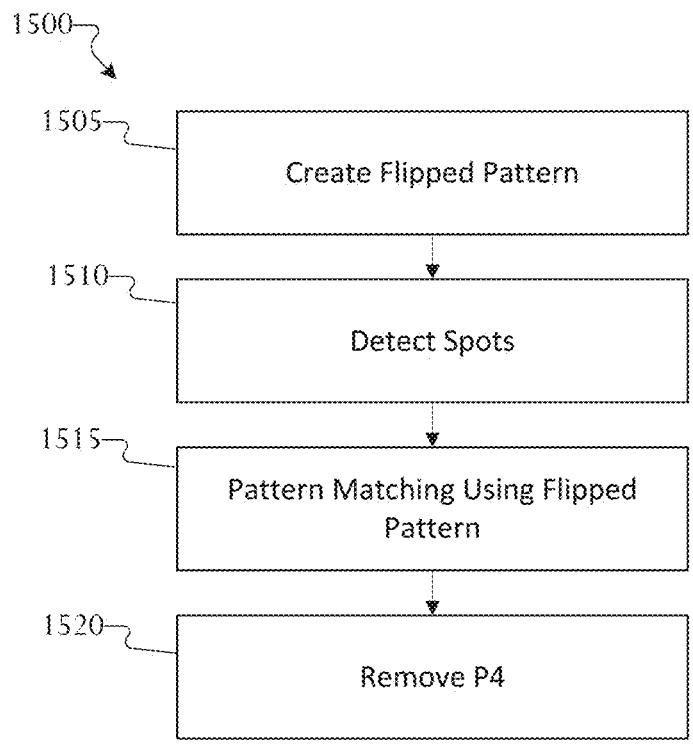
FIG. 15 illustrates a P4 filtering process according to embodiments of the present disclosure.

FIG. 15 illustrates a P4 filtering process 1500 according to embodiments of the present disclosure. FIG. 15 does not limit the scope of this disclosure to any particular embodiments. While process 1500 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the P4 filtering process 1500 is described with respect to processing system 725 of the FPES 700 of FIG. 7. However, the P4 filtering process 1500 can be used with any other suitable system.

In block 1505 a light source emits a light directed at a wearer's eye. The light source emits an image that has an asymmetric-upside-down structure. As the light traverses through the cornea and lens, the light is reflected on a back surface of the lens and traverses back through a front surface of the lens and cornea. The reflection of the light on the back of the lens and refraction occurring during each transition through the front surface of the lens and cornea causes the image emitted by the light source to be inverted, i.e., flipped. Thus, the reflection of the light from the eye creates a flipped pattern as the light exits the eye.

In block 1510, the FPES detects spots on the wearer's eye. For example, a camera in the FPES 700, such as camera 735, captures an image of the wearer's eye. The processing system 725 analyzes the image of the eye to detect the spots a identify P1, P2, P3, and P4.

In block 1515, the FPES performs pattern matching to identify P4. For example, the processing system 725 analyzes the source image and, using patter recognition, identifies a spot corresponding to a flipped version of the source image. The processing system 725 determines that the spot having the flipped image is 4. Thereafter, the processing system 725 removes, filters, or ignores P4 in block 1520.

Figure 16:
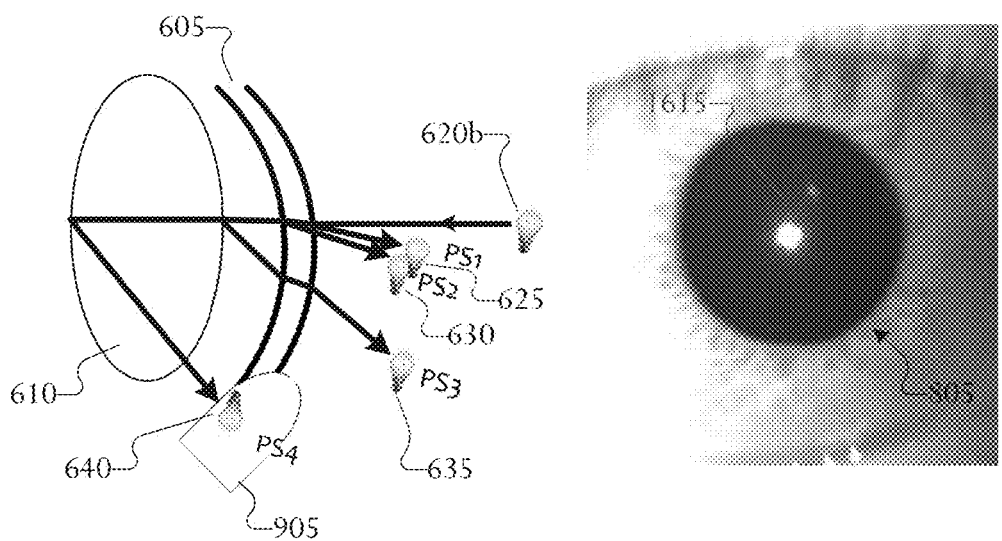
FIG. 16 illustrates an example reflection point determination in which a second reflection point is blocked according to embodiments of the present disclosure.
Figure 17A:
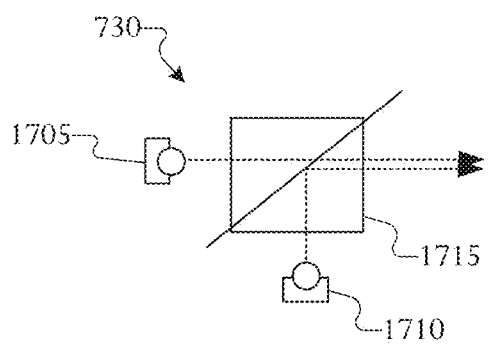
FIGS. 17A, 17B, 17C, and 17D illustrate a light source according to embodiments of the present disclosure.
Figure 17B:
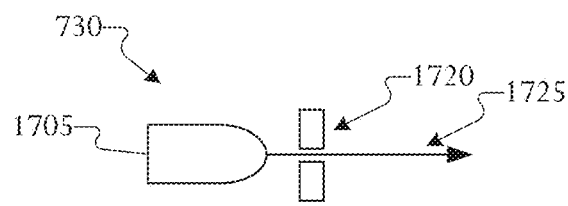
Figure 17C:
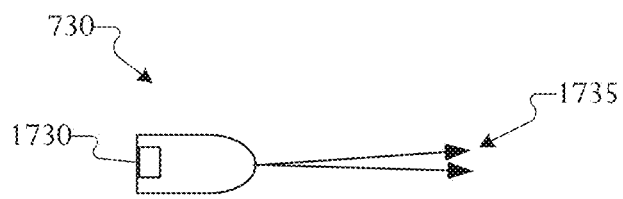
Figure 17D:

FIG. 16 illustrates an example reflection point determination in which a second reflection point is blocked according to embodiments of the present disclosure. The embodiment of reflection point determination shown in FIG. 16 is for illustration only. Other embodiments could be used without departing from the scope of the present disclosure.

In certain configurations, the FPES 700 can be configured such that the fourth second point PS4 640 is obscured, or blocked by PS1 625 in the iris 905 of the eye 705. As with the example illustrated in FIG. 9, fourth reflection point PS4 640 is obscured, obstructed, or blocked by the iris 905 of the eye 705. The light emitted from light source 620 is initially reflected such that the second reflection point PS2 630 is detectable at position P2 815 in FIG. 8. The FPES 700 is configured to filter PS2 630 to be hidden by PS1 625 such that PS2 630 is not present 1615 in the pupil 805. Accordingly, to calibrate the FPES 700 properly to the user's eye, the light source 620 is adjusted to new light source position 620b. With light emitted at the new light source position 620b, the second reflection point PS2 630 is not detectable, not present 1615, within the pupil 805.

FIGS. 17A, 17B, 17C, and 17D illustrate a light source according to embodiments of the present disclosure. The embodiments of the light source are for illustration only. Other embodiments could be used without departing from the scope of the present disclosure. The infrared light source 730 of FIG. 7 can be configured the same as, or similar to, one of the light sources depicted in FIGS. 17A-17D.

In certain embodiments, to align an optical axis of a light and user's eyeball, a light of infrared LED must be visible. Because Infrared is invisible for users, a user may not be able to align an optical axis. In certain embodiments, the light source 730 includes an infrared LED 1705 and a visible LED 1710. The LED 1710 emits a visible ray such that a user is able to see it. Both the infrared LED 1705 and the visible LED 1710 emit light through a prism 1715 such that the light beams are aligned and directed towards the user's eye through the mirror. The user may look at an object through the red spot emitted by the visible LED 1710 and, while doing so, PS1 hides PS2.

In certain embodiments, the light source 730 includes two or more visible light LED's. In certain embodiments, the LED 1710 is a color changeable LED. For example, if a user is color-blind, an LED that emits a light visible to the color-blind user can be selected.

In certain embodiments, the light source 730 includes a small aperture 1720. The LED 1705 small aperture 1720 emits a light toward the mirror through the small aperture 1720. The small aperture 1720 is configured to reduce an aperture size of the LED 1705. For example, the small aperture 1720 can be configured to reduce the aperture size of the LED 1705 to 1 millimeter (mm). By using the small aperture 1720, the light source 730 emits a narrow light beam 1725 such that P2 815 and P4 820 do not appear in the pupil 805.

In certain embodiments, the light source 730 includes a tiny LED source 1730. The LED 1730 emits a light toward the mirror with a narrow beam 1735. By using the small tiny LED source 1730, the light source 730 emits a narrow light beam 1735 such that P2 815 and P4 820 do not appear in the pupil 805.

In certain embodiments, the light source 730 includes a narrow angle LED source 1740. The narrow angle LED source 1740 emits a light toward the mirror with a narrow angle spread beam 1745. By using the narrow angle LED source 1740, the light source 730 emits a narrow angle spread beam 1745 such that P2 815 and P4 820 do not appear in the pupil 805.

FIGS. 18A, 18B, 18C, and 18D illustrate another example reflection point determination in which a second reflection point is blocked according to embodiments of the present disclosure. The embodiments of reflection point determination shown in FIGS. 18A-18D are for illustration only. Other embodiments could be used without departing from the scope of the present disclosure.

Figure 18A:
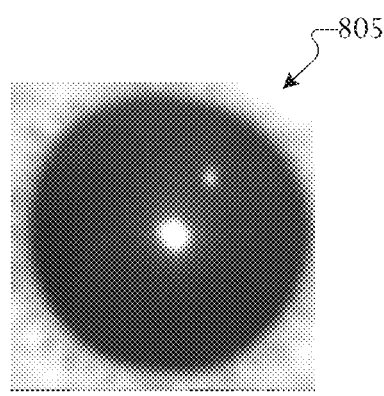
FIGS. 18A, 18B, 18C, and 18D illustrate another example reflection point determination in which a second reflection point is blocked according to embodiments of the present disclosure.
Figure 18B:
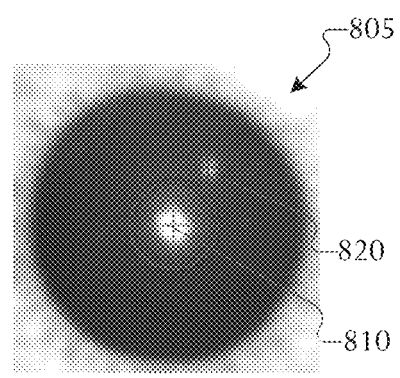
Figure 18C:
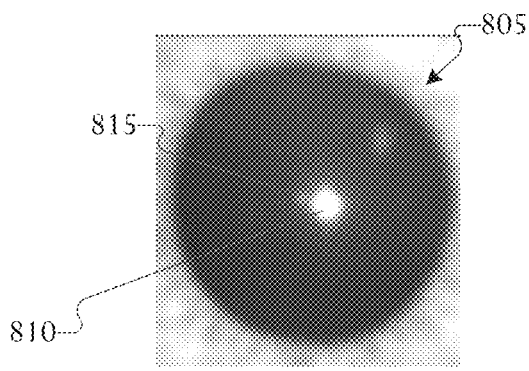
Figure 18D:
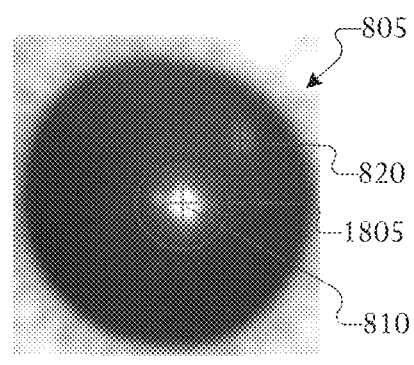

Because an eye is constantly in motion, that is, constantly vibrating, P2 sometimes appears near P1. In the example shown in FIG. 18A, the FPES 700 camera 735 captures a good image of the eye pupil 805. As shown in FIG. 18B, the FPES 700, such as processing circuitry 725, performs spot detection and identifies P1 810 and P3 820. In the example shown in FIG. 18C, the FPES camera captures another image of the eye pupil 805 in which movement of the eye causes P2 815 to no longer be hidden by P1 810. The FPES, such as processing circuitry 725, filters P2 815 from the image by one of: interpreting a region 1805 around P1 810 as being P1 810 such that anything within the region 1805 is a part of P1 810; or ignoring any spots within region 1805 as "artifacts". Thereafter, the FPES 700, such as processing circuitry 725, is able to identify the remaining spot, which is well outside of region 1805, as being P3 820 since P2 815 is always closer to P1 810 than is P3 820.

In certain embodiments, the processing circuitry 725 is able to remove P2 815 and P4 825 using relative sizes. For example, as indicated previously, the illuminance of the light source 730 is 100% while the illuminance of PS1 625 is 2.5% with a magnification of 0.072; the illuminance of PS2 630 is 0.02% with a magnification of 0.06, the illuminance of PS3 635 is 0.09% with a magnification of 0.086; and the illuminance of PS4 640 is 0.09% with a magnification of 0.05. Further, the image at PS4 is inverted (i.e., flipped) from the image at the light source. Accordingly, the smallest magnifications are that of PS4 640 at 0.05 and PS2 630 at 0.06 while both PS1 625 and PS3 635 have magnifications at or above 0.072, which is well above the 0.06 of PS2 630 and 0.05 of PS4 640. Therefore, the processing circuitry 725 identifies the smaller spots as being P2 815 and P4 825 respectively and ignores them in the captured image of the pupil 805.

Figure 19:
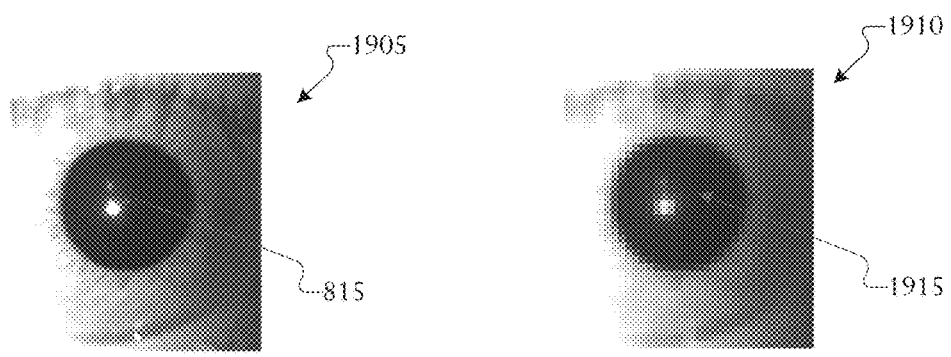
FIG. 19 illustrates an example reflection point determination in which a second reflection point is filtered using a low-resolution image according to embodiments of the present disclosure.

FIG. 19 illustrates an example reflection point determination in which a second reflection point is filtered using a low-resolution image according to embodiments of the present disclosure. The example of the low-resolution image filtering shown in FIG. 19 is for illustration only and other embodiments could be used without departing from the scope of the present disclosure.

In certain embodiments, the FPES 700 is configured to ignore one or more reflection points, such as P2 815 or P4 825 by using a low-resolution camera. For example, in certain embodiments, the infrared camera 735 can be a low-resolution camera. In certain embodiments, the FPES 700 includes at least a high-resolution camera and a low-resolution camera. In the example shown in FIG. 19, a high-resolution image 1905 of the eye is captured using a high-resolution camera. The high-resolution camera captures images of the eye at a detail sufficiently high such that P2 815 is apparent. Therefore, the FPES 700 uses a low-resolution camera to capture a low-resolution image 1910 of the eye. The low-resolution image 1910 does not generate enough detail or level of granularity to show P2 and, as such, P2 is no longer visible 1915.

In certain embodiments, the infrared camera 735 is a high-resolution camera and the image is resized or filtered through a low-pass filter. For example, the infrared camera 735 can capture a high-resolution image of the eye such that P2 815 is apparent. The processing system 725 resizes the image such that the image is converted from a high-resolution image 1905 to a low-resolution image 1910 in which P2 is no longer visible 1915. In certain embodiments, the processing system 725 passes the image through a low-pass filter such that the image is converted from a high-resolution image 1905 to a low-resolution image 1910 in which P2 is no longer visible 1915.

Figure 20:
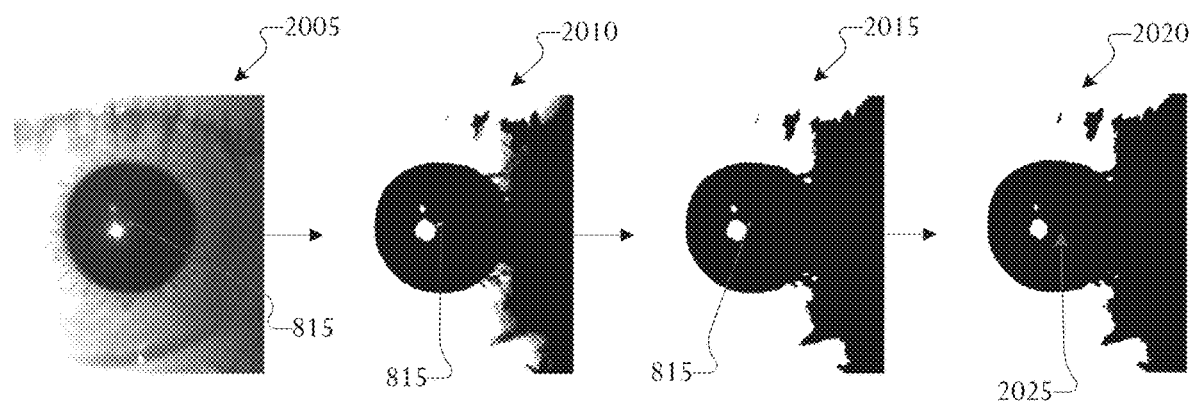
FIG. 20 illustrates an example reflection point determination in which a second reflection point is filtered using binarization and morphology according to embodiments of the present disclosure.

FIG. 20 illustrates an example reflection point determination in which a second reflection point is filtered using binarization and morphology according to embodiments of the present disclosure. The example of the binarization and morphology filtering shown in FIG. 20 is for illustration only and other embodiments could be used without departing from the scope of the present disclosure.

In certain embodiments, the FPES 700 includes binarization and morphology filters. After an image 2005 of the eye is captured by the infrared camera 735, the processing system 725 passes the image 2005 through the binarization and morphology filters. In the image 2005, P2 815 is apparent. The processing system 725 first apples a binarization filtering to the image 2005 to generate a second (black and white) image 2010. In the second image 2010, P2 815 is now visible as one of the white marks within the image. The processing system 725 then applies the morphology filter to the second image to generate the third image 2015. The morphology filter can fill in white spots utilizing a specified parameter. In the third image 2015, the white marks are reduced but P2 815 may still be apparent. The processing system 725 then applies the morphology filter to the third image 2015 to generate a fourth image 2020. The morphology filter again fills in white spots utilizing a specified parameter. In the fourth image 2020, the white marks are reduced and P2 815 is no longer visible 2025.

Figure 21A:
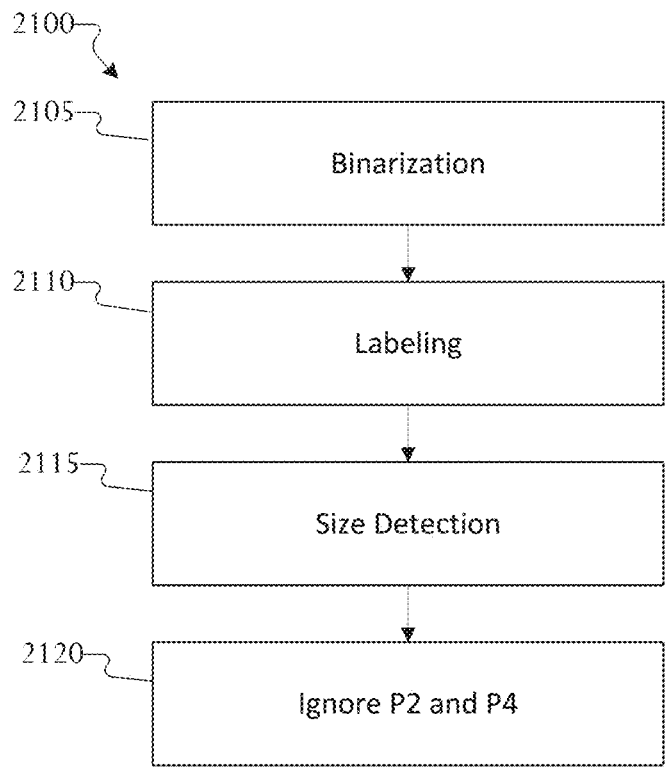
FIGS. 21A and 21B illustrate a P2/P4 filtering process according to embodiments of the present disclosure.
Figure 21B:
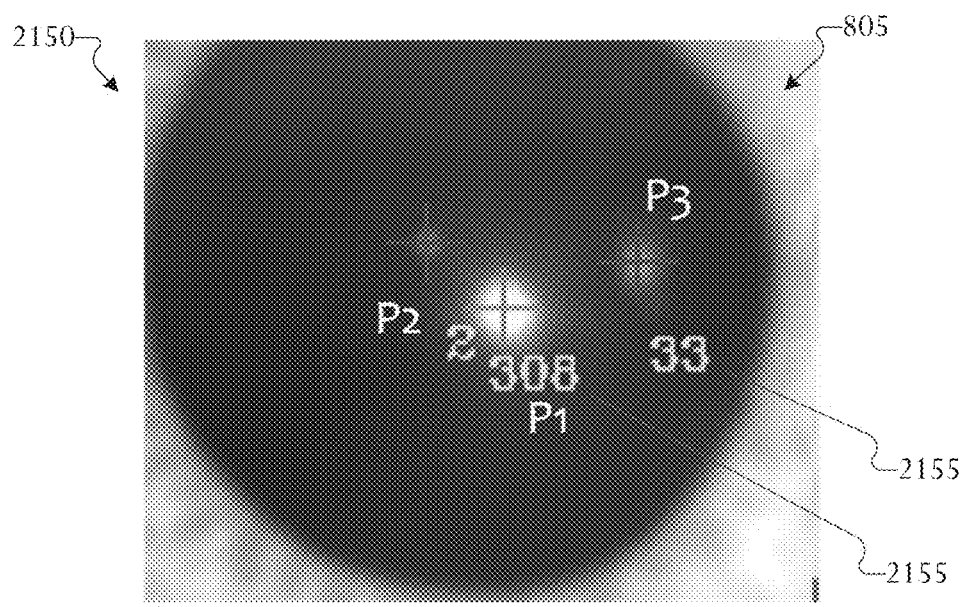

FIGS. 21A and 21B illustrate a P2/P4 filtering process 2100 according to embodiments of the present disclosure. FIGS. 21A and 21B do not limit the scope of this disclosure to any particular embodiments. While P2/P4 filtering process 2100 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the P2/P4 filtering process 2100 is described with respect to processing system 725 of the FPES 700 of FIG. 7. However, the P2/P4 filtering process 2100 can be used with any other suitable system.

In block 2105 binarization is applied to an image 2150 captured by a camera, such as infrared camera 735, of the FPES 700. The processing system 725 then identifies and labels spots within the pupil 805 in block 2110. In block 2115, the processing system 725 determines the respective sizes 2155 of each of the spots. The processing system 725 identifies the spots having the smallest sizes, determines that such spots correspond to P2 and P4 and ignores the identified P2 and P4 in block 2120.

Figure 22A:
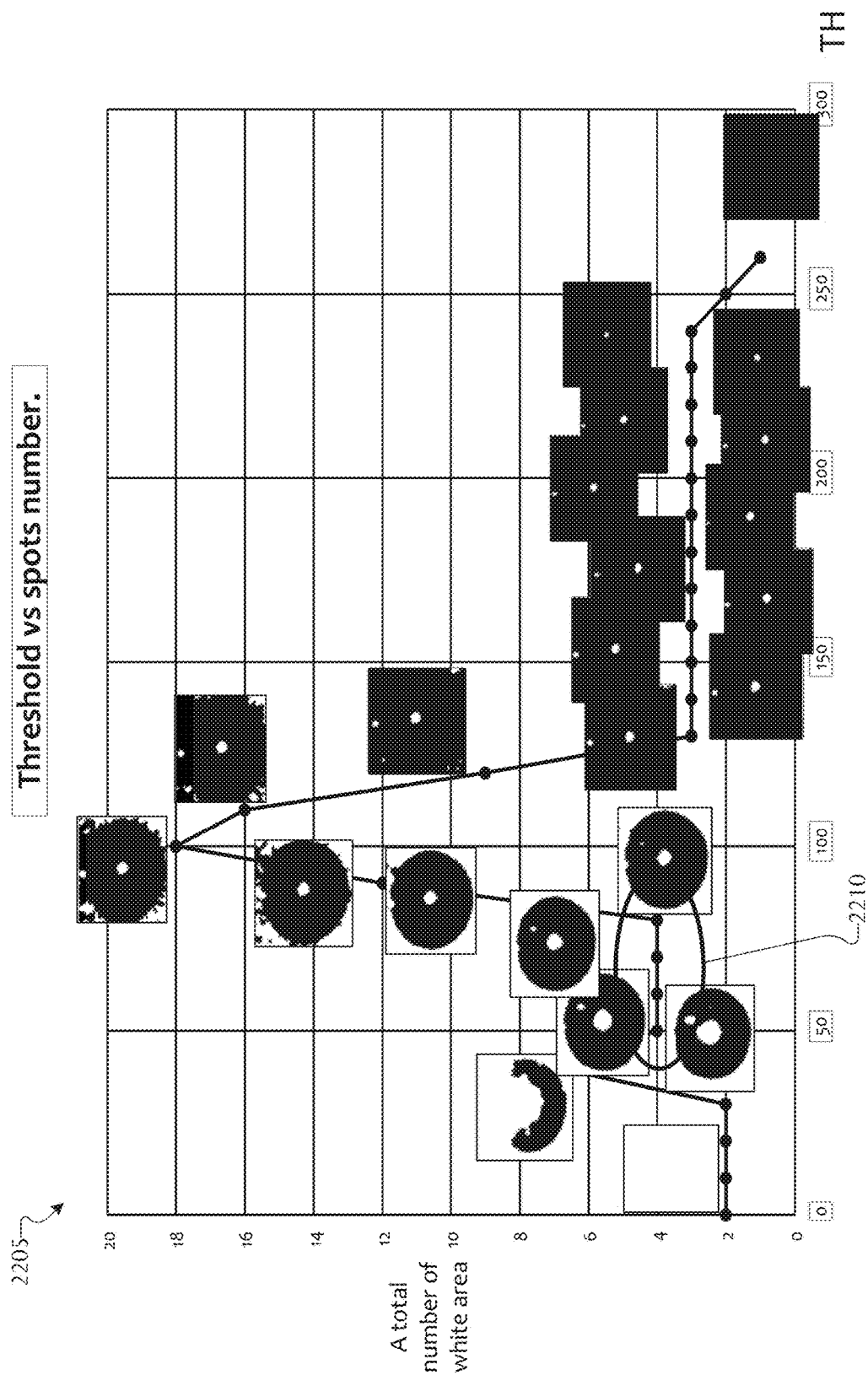
FIGS. 22A and 22B illustrate an example software parameter optimization process according to embodiments of the present disclosure.
Figure 22B:
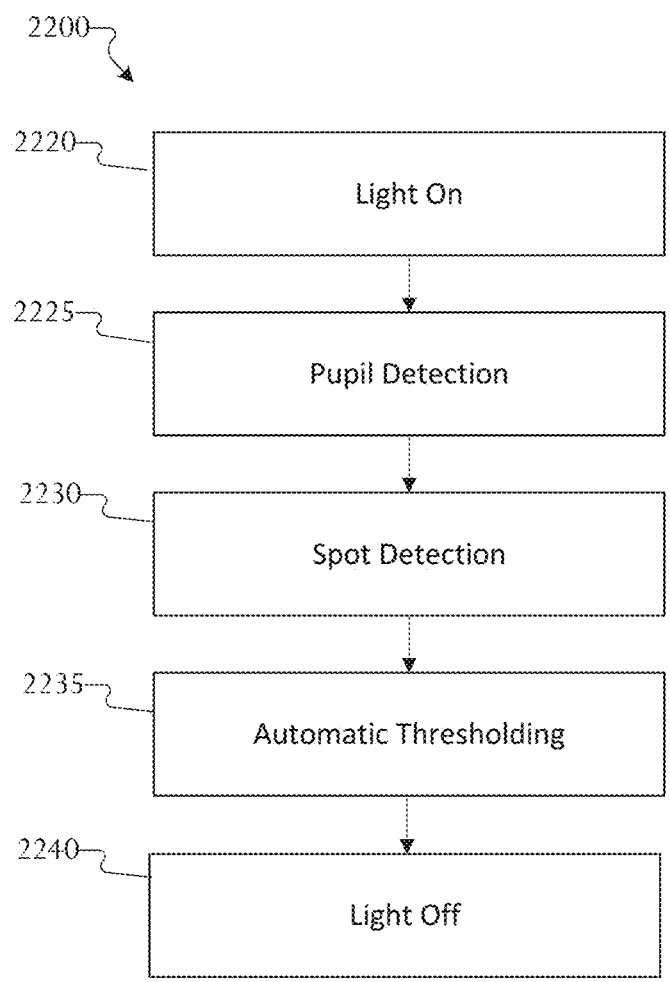

FIGS. 22A and 22B illustrate an example software parameter optimization process according to embodiments of the present disclosure. FIGS. 22A and 22B do not limit the scope of this disclosure to any particular embodiments. While software parameter optimization process 2200 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the software parameter optimization process 2200 is described with respect to processing system 725 of the FPES 700 of FIG. 7. However, the software parameter optimization process 2200 can be used with any other suitable system.

Images having two spots are desired for use by the FPES 700 to perform focal point estimation. In certain embodiments, a resultant image depends on a thresholding parameter. FIG. 22A shows a graph 2205 that depicts a relationship between a threshold value and a number of spots. The FPES 700 is watching a number of spots and picks up images that have two spots. For example, region 2210 illustrates a range that is available for a particular eye although additional variations exist.

As shown in FIG. 22B, in block 2220, the FPES 700 activates the light source 730 such that a light is emitted towards the user's eye. In block 2225, the FPES 700 performs pupil detection in which, infrared camera 735 captures an image of the user's eye and the processing system 725 analyzes the image of the user's eye to identify the pupil 805. In block 2230, the processing system 725 analyzes the image of the user's eye to detect the spots in the pupil 805. In block 2235, the processing system 725 automatically, that is, without user intervention, applies a thresholding to eliminate spots, such as P2 and P4, from the pupil 805. The processing system 725 then detects P1 and P3 in the pupil 805. Thereafter, the FPES 700 deactivates the light source 730 to turn off the light in block 2240.

Figure 23:
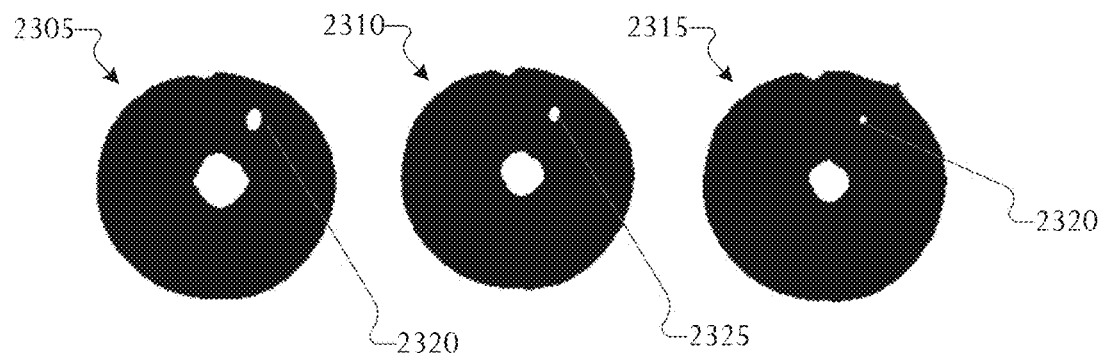
FIG. 23 illustrates another example reflection point determination in which a second reflection point is filtered using side identification according to embodiments of the present disclosure.

FIG. 23 illustrates another example reflection point determination in which a second reflection point is filtered using side identification according to embodiments of the present disclosure. The example of the filtering shown in FIG. 23 is for illustration only and other embodiments could be used without departing from the scope of the present disclosure.

In certain embodiments, the FPES 700, namely the processing system 725, analyzes three images 2305, 2310, 2315 of an eye. For example, due to the continuous movement of the eye, in certain embodiments, the FPES 700 captures several images of the eye to account for the movement and provide for stabilization. The processing system 725 identifies spots corresponding to P2, such as a first spot 2320 in the first image 2305, a second spot 2325 in the second image 2310, and a third spot 2330 in the third image 2315. The processing system 725 compares sizes of the spots to determine which of the P2 spots has a size that is in the middle. The FPES 700 uses the middle size, namely second spot 2325 in the example shown in FIG. 23, to calibrate the FPES 700.

Figure 24:
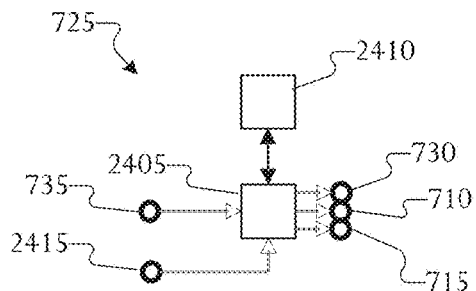
FIG. 24 illustrates an example processing system according to embodiments of the present disclosure.

FIG. 24 illustrates an example processing system 725 according to embodiments of the present disclosure. The embodiment of the processing system 725 shown in FIG. 24 is for illustration only and other embodiments could be used without departing from the present disclosure.

In certain embodiments, the processing system 725 includes one or more processors configured as a focal point estimator 2405. In certain embodiments, the processing system 725 includes a single processor configured to control the operations of the FPES as well as perform the functions of the focal point estimator 2405. The focal point estimator 2405 is configured to estimate a focal point according to one or more of the methods outlined herein above.

In certain embodiments, the processing system 725 includes a focal point database 2410. The focal point database 2410 can be stored in the memory of the processing system 725. The processing system 725 can store captured images in focal point database 2410 as well as pupil and spot detection information. The focal point database 2410 can include a plurality of eye rotation, anterior surface and inner lens curvature data of the user looking at a particular object placed at different positions during a calibration mode. Additionally, the processing system 725 can retrieve focal point estimation information from the focal point database 2410.

The processing system 725 is configured to receive data signals from infrared camera 735. The processing system 725 stores the received data signals in the focal point database 2410 for recall and use in configuring the FPES 700. In certain embodiments, the camera system operates responsive to a user input 2415, such as via a touch input, button, or other control input for measurement (i.e., a measurement button). For example, when a user pushes the measurement button, the FPES changes a display focal point to a user's focal point. The processing system 725 drives the operation of, such as by issuing command signals, the light source 730, the OLED display 710, and the lens assembly 715.

Figure 25:
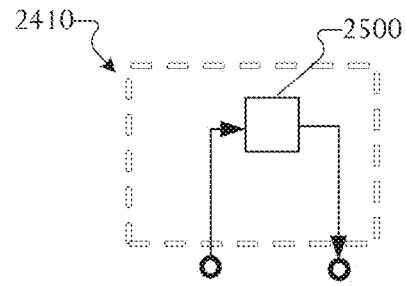
FIG. 25 illustrates an example focal point database according to embodiments of the present disclosure.

FIG. 25 illustrates an example focal point database 2410 according to embodiments of the present disclosure. The embodiment of the focal point database 2410 shown in FIG. 25 is for illustration only and other embodiments could be used without departing from the present disclosure.

In certain embodiments, the focal point database 2410 includes a reflected light database 2500. The reflected light database 2500 can store one or more images of the user's eye and the respective light reflection points therein.

Figure 26:
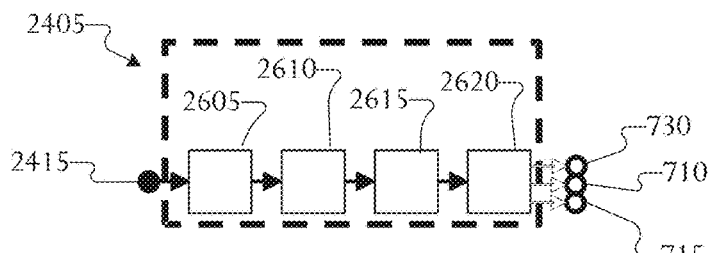
FIG. 26 illustrates an example focal point estimator according to embodiments of the present disclosure.

FIG. 26 illustrates an example focal point estimator 2405 according to embodiments of the present disclosure. The embodiment of the focal point estimator 2405 shown in FIG. 26 is for illustration only and other embodiments could be used without departing from the present disclosure.

In certain embodiments, the focal point estimator 2405 includes one or more processors configured as an eye detector 2605, pupil detector 2610, spot detector 2615, and distance calculator 2620. In certain embodiments, the focal point estimator comprises a single processor configured to perform the functions of each of: the eye detector 2605, pupil detector 2610, spot detector 2615, and distance calculator 2620. The eye detector 2605 is configured to analyze an image of the wearer's eye, such as captured by the infrared camera 735. The eye detector 2605 identifies features corresponding to the wearer's eye, such as by identifying features corresponding to the sclera and cornea of the eye. The pupil detector 2610 analyzes the identified eye, such as identified by eye detector 2605. The pupil detector 2610 detects a region in the identified eye corresponding to the pupil 805. The spot detector 2615 analyzes the pupil 805 to identify spots corresponding to reflected light, such as P1, P2, P3, and P4. The spot detector 2615 identifies spots corresponding to P3 and P4 as described herein above. The distance calculator 2620 calculates a distance between P3 and P4 to determine a corresponding estimated thickness of the lens and cornea and estimate a focal point of the eye.

Figure 27:
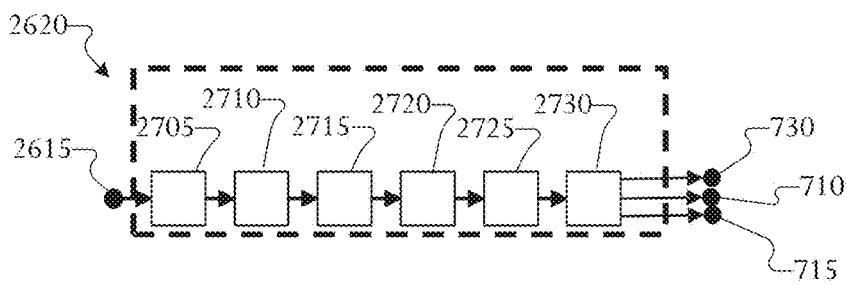
FIG. 27 illustrates an example distance calculator according to embodiments of the present disclosure.

FIG. 27 illustrates an example distance calculator 2620 according to embodiments of the present disclosure. The embodiment of the distance calculator 2620 shown in FIG. 27 is for illustration only and other embodiments could be used without departing from the present disclosure.

In certain embodiments, the distance calculator 2620 includes one or more processors configured to calculate a distance between P3 and P4. In certain embodiments, the distance calculator 2620 includes processors for labeling 2705, gravity estimation 2710, sum estimation 2715, sorting 2720, distance estimation 2725, and stabilization 2730. In certain embodiments, the focal point estimator comprises a single processor configured to perform the functions of each of: the labeling 2705, gravity estimation 2710, sum estimation 2715, sorting 2720, distance estimation 2725, and stabilization 2730.

Figure 28:
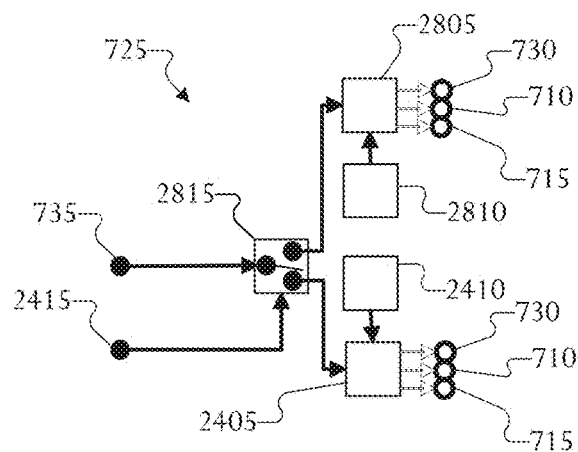
FIG. 28 illustrates another example processing system according to embodiments of the present disclosure.

FIG. 28 illustrates another example processing system 725 according to embodiments of the present disclosure. The embodiment of the processing system 725 shown in FIG. 28 is for illustration only and other embodiments could be used without departing from the present disclosure.

In certain embodiments, the processing system 725 is configured to perform gaze tracking. Gaze tracking measures vector from P1 to center of the pupil. For example, the processing system 725 can include one or more processors configured to perform gaze tracking. In certain embodiments, the processing system 725 includes the focal point estimator 2405, the focal point database 2410, a gaze tracker 2805 and a gaze database 2810. In certain embodiments, the processing system 725 includes a single processor configured to control the operations of the FPES as well as perform the functions of the focal point estimator 2405 and gaze tracker 2805. The gaze tracker 2805 is configured to perform gaze tracking according to one or more of the methods outlined herein below with respect to FIGS. 31A-31D. In certain embodiments, the processing system 725 includes a switch 2815 to vary an input source between the infrared camera 735 and the user input 2415.

The gaze tracker 2805 is configured to track PS1 as the user looks different directions. The gaze tracker 2805 calculates a vector from PS1 to the center of the pupil as the user looks in different directions to determine the user's gaze.

The processing system 725 is configured to receive data signals from infrared camera 735 of user inputs via user input 2415, or a combination thereof. The gaze tracker 2805 stores the received data signals corresponding to gaze tracking in the gaze database 2810 for recall and use in configuring the FPES 700. The gaze database 2810 includes information formulated based on a 1st vector representing changes in anterior surface curvature and inner lens thickness of the eye of the user and a 2nd vector representing eye rotation changes caused by position changes of the particular object. The focal point estimator 2405 stores the received data signals corresponding to focal point estimation in the focal point database 2410 for recall and use in configuring the FPES 700. The focal point estimator 2405 stores the received data signals in the focal point database 2410 for recall and use in configuring the FPES 700. The gaze database 2810 stores gaze information in the gaze database 2810 for recall and use in configuring the FPES 700. The processing system 725, such as gaze tracker 2805 and focal point estimator 2405 respectively, drives the operation of, such as by issuing command signals, the light source 730, the OLED display 710, and the lens assembly 715.

Figure 29:
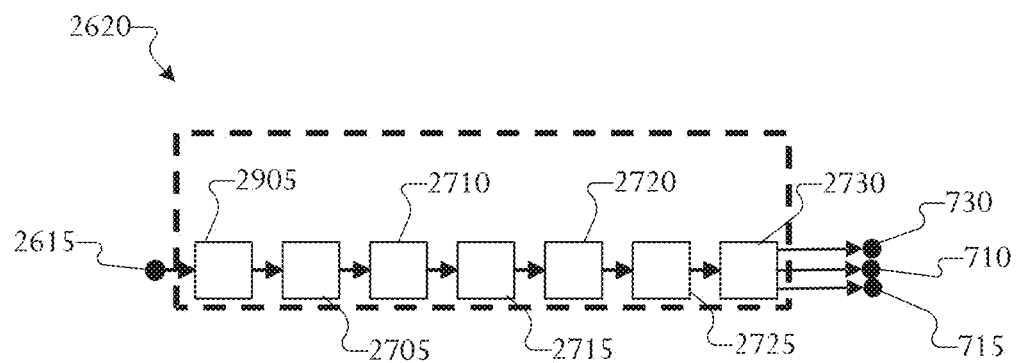
FIG. 29 illustrates another example distance calculator according to embodiments of the present disclosure.

FIG. 29 illustrates another example distance calculator 2620 according to embodiments of the present disclosure. The embodiment of the distance calculator 2620 shown in FIG. 29 is for illustration only and other embodiments could be used without departing from the present disclosure.

In certain embodiments, the distance calculator 2620 includes one or more processors configured to perform a thresholding 2905. The thresholding 2905 can be performed as described herein above with respect to FIGS. 22A and 22B. In certain embodiments, the distance calculator 2620 includes processors for thresholding 2905, labeling 2705, gravity estimation 2710, sum estimation 2715, sorting 2720, distance estimation 2725, and stabilization 2730. In certain embodiments, the focal point estimator comprises a single processor configured to perform the functions of each of: the thresholding 2905, the labeling 2705, gravity estimation 2710, sum estimation 2715, sorting 2720, distance estimation 2725, and stabilization 2730.

Figure 30:
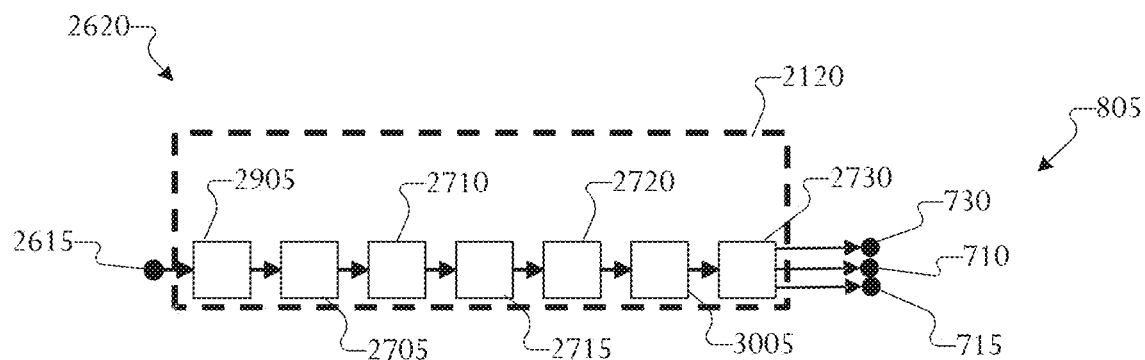
FIG. 30 illustrates another example distance calculator for gaze tracking according to embodiments of the present disclosure.

FIG. 30 illustrates another example distance calculator 2620 for gaze tracking according to embodiments of the present disclosure. The embodiment of the distance calculator 2620 shown in FIG. 30 is for illustration only and other embodiments could be used without departing from the present disclosure.

In certain embodiments, the distance calculator 2620 includes one or more processors configured to perform a gaze tracking function. Gaze tracking measures vector from P1 to center of the pupil. In certain embodiments, the distance calculator 2620 includes processors for thresholding 2905, labeling 2705, gravity estimation 2710, sum estimation 2715, sorting 2720, vector estimation 3005, and stabilization 2730. In certain embodiments, the focal point estimator comprises a single processor configured to perform the functions of each of: the thresholding 2905, the labeling 2705, gravity estimation 2710, sum estimation 2715, sorting 2720, vector estimation 3005, and stabilization 2730. The vector estimation 3005 can measure a vector from P1 to center of the pupil as shown in FIGS. 31A-31D.

Figure 31A:
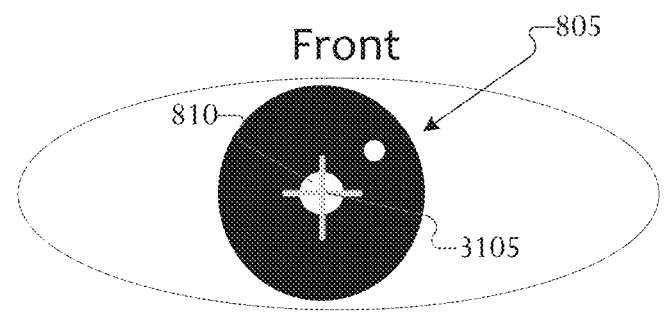
FIGS. 31A, 31B, 31C, and 31D illustrate a gaze tracking process according to embodiments of the present disclosure.
Figure 31B:
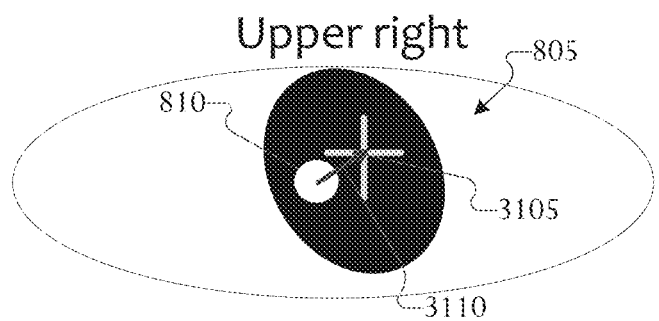
Figure 31C:
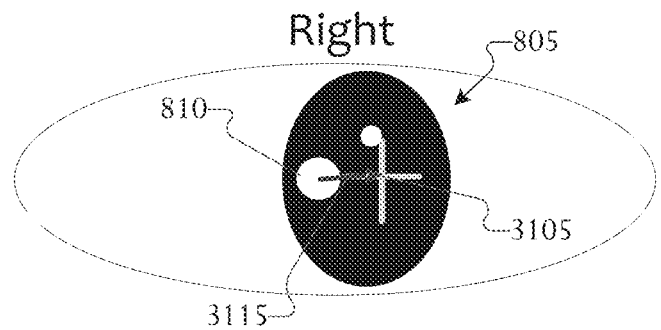
Figure 31D:
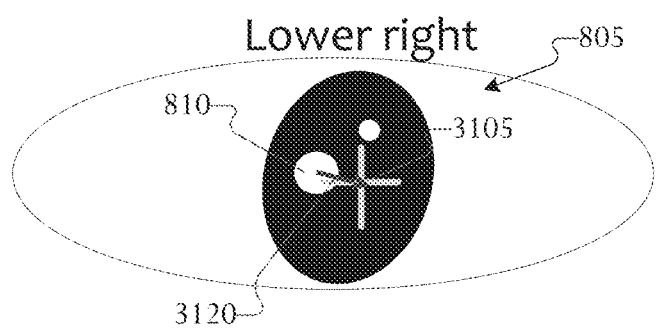

FIGS. 31A, 31B, 31C, and 31D illustrate a gaze tracking process according to embodiments of the present disclosure. The embodiment of the gaze tracking process shown in FIGS. 31A-3D is for illustration only and other examples could be used without departing from the scope of the present disclosure.

In certain embodiments, the FPES 700 is configured to perform gaze tracking. Gaze tracking measures vector from P1 to center of the pupil. For example, the FPES 700 can include a processing system 725 having a gaze tracker 2805.

In FIGS. 31A-31D, the + designates the center 3105 of the pupil 805 having point P1 810. In the example shown in FIG. 31A, the user is facing front. In the example shown in FIG. 31B, the user looks up to the right. The gaze tracker 2805 calculates a vector 3110 from P1 810 to the center 3105 of the pupil 805. In the example shown in FIG. 31C, the user looks to the right. The gaze tracker 2805 calculates a vector 3115 from P1 810 to the center 3105 of the pupil 805. In the example shown in FIG. 31D, the user looks to the lower right. The gaze tracker 2805 calculates a vector 3120 from P1 810 to the center 3105 of the pupil 805. Accordingly, based on movements of the user's eye, the gaze tracker 2805 calculates a respective vector from P1 810 to the center 3105 of the pupil 805 in order to determine a user's gaze.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
a light source comprising a plurality of lights and configured to emit a light towards an eye of a user of the electronic device;
an adjustable lens having an adjustable focal point;
a light sensor, coupled to the adjustable lens, configured to detect a reflection pattern of a reflected light that is reflected from the eye of the user, the reflection pattern comprising a plurality of reflection points;
a processor, coupled to the adjustable lens, configured to:
select one of the plurality of lights based on an eye position;
determine a first distance corresponding to a focal point of the eye of the user based on one or more positions of the plurality of reflection points in the reflected light, and
adjust the focal point of the adjustable lens based on the focal point of the eye; and
a display screen, coupled to the processor, configured to present an image of an object at a second distance based on the focal point of the adjustable lens to create a perception for the user that the object is placed at the first distance.

2. The electronic device of claim 1, wherein the first distance of the object is determined based on:
eye rotation and anterior surface curvature of the eye of the user and an inner lens of the eye of the user while the user is looking at the object, and
a database comprising a plurality of eye rotation, anterior surface and inner lens curvature data of the user looking at a particular object placed at different positions during a calibration mode.

3. The electronic device of claim 2, wherein the database is formulated based on a first vector representing anterior surface curvature and a change in an inner lens thickness of the eye and a second vector representing eye rotation changes caused by position changes of the particular object.

4. The electronic device of claim 1, wherein the processor is configured to:
detect the plurality of reflection points in a pupil of the eye of the user;
calculate a distance between at least two points among the plurality of reflection points; and
determine the focal point of the eye based on the distance between the at least two points.

5. The electronic device of claim 4, wherein the processor is further configured to filter at least one reflection point from the plurality of reflection points.

6. The electronic device of claim 5, wherein the processor is configured to filter the at least one reflection point by one or more of:
varying a location of the light source that emits the light towards the eye of the user;
emitting light from a different light source from a plurality of light sources;
varying an orientation of a reflective surface, wherein the reflective surface is configured to reflect the light towards the eye of the user;
varying a location of the light sensor;
varying a position of the electronic device on a head of the user;
adjusting a size of a captured image of the eye;
adjusting a resolution of an image of the eye; or
using binarization and morphology to remove the at least one reflection point.

7. The electronic device of claim 1, wherein the processor is configured to determine a gaze of the user by calculating vector between a center of a pupil of the eye and a reflection point corresponding to light reflected from an outer surface of a cornea of the eye.

8. A method comprising:
selecting one of a plurality of lights in a light source based on an eye position;
emitting, by the light source, a light towards an eye of a user of an electronic device;
detecting, by a light sensor, a reflected light that is reflected from the eye of the user, the reflected light comprising a reflection pattern including a plurality of reflection points;
determining a first distance corresponding to a focal point of the eye of the user based on one or more positions of the a plurality of reflection points in the reflected light;
adjusting the focal point of an adjustable lens based on the focal point of the eye; and
displaying an image of an object at a second distance based on the focal point of the adjustable lens to create a perception for the user that the object is placed at the first distance.

9. The method of claim 8, wherein the first distance of the object is determined based on:
eye rotation and anterior surface curvature of the eye of the user and an inner lens of the eye of the user while the user is looking at the object, and
a database comprising a plurality of eye rotation, anterior surface and inner lens curvature data of the user looking at a particular object placed at different positions during a calibration mode.

10. The method of claim 9, wherein the database is formulated based on a first vector representing anterior surface curvature and a change in an inner lens thickness of the eye and a second vector representing eye rotation changes caused by position changes of the particular object.

11. The method of claim 9, further comprising:
detecting the plurality of reflection points in a pupil of the eye of the user;
calculating a distance between at least two points among the plurality of reflection points; and
determining the focal point of the eye based on the distance between the at least two points.

12. The method of claim 11, further comprising filtering at least one reflection point from the plurality of reflection points.

13. The method of claim 12, wherein filtering the at least one reflection point comprises one or more of:
varying a location of a light source that emits a light towards the eye of the user;
emitting light from a different light source from a plurality of light sources;
varying an orientation of a reflective surface, wherein the reflective surface is configured to reflect the light towards the eye of the user;
varying a location of the light sensor;
varying a position of the electronic device on a head of the user;
adjusting a size of a captured image of the eye;
adjusting a resolution of an image of the eye; or
using binarization and morphology to remove the at least one reflection point.

14. The method of claim 8, further comprising determining a gaze of the user by calculating a vector between a center of a pupil of the eye and a reflection point corresponding to light reflected from an outer surface of a cornea of the eye.

15. A non-transitory computer readable medium embodying a computer program for operating an electronic device including a memory and at least one processor, the computer program comprising computer readable program code that, when executed by the at least one processor, causes the electronic device to:
  select one of a plurality of lights in a light source based on an eye position
  emit, by the light source, a light towards an eye of a user of the electronic device;
  detect, by a light sensor, a reflection pattern of a reflected light that is reflected from the eye of the user, the reflection pattern comprising a plurality of reflection points;
  determine a first distance corresponding to a focal point of the eye of the user based on one or more positions of the plurality of reflection points in the reflected light;
  adjust the focal point of an adjustable lens based on the focal point of the eye; and
  display an image of an object at a second distance based on the focal point of the adjustable lens to create a perception for the user that the object is placed at the first distance.

16. The non-transitory computer readable medium of claim 15, wherein the first distance of the object is determined based on:
  eye rotation and anterior surface curvature of the eye of the user and an inner lens of the eye of the user while the user is looking at the object, and
  a database comprising a plurality of eye rotation, anterior surface and inner lens curvature data of the user looking at a particular object placed at different positions during a calibration mode.

17. The non-transitory computer readable medium of claim 15, wherein the computer readable program code is configured to cause the at least one processor to:
  detect the plurality of reflection points in a pupil of the eye of the user;
  calculate a distance between at least two points among the plurality of reflection points; and
  determine the focal point of the eye based on the distance between the at least two points.

18. The non-transitory computer readable medium of claim 17, wherein the computer readable program code is configured to cause the at least one processor to filter at least one reflection point from the plurality of reflection points.

19. The non-transitory computer readable medium of claim 18, wherein the computer readable program code is configured to cause the at least one processor to filter the at least one reflection point by one or more of:
  varying a location of a light source that emits a light towards the eye of the user;
  emitting light from a different light source from a plurality of light sources;
  varying an orientation of a reflective surface, wherein the reflective surface is configured to reflect the light towards the eye of the user;
  varying a location of the light sensor;
  varying a position of the electronic device on a head of the user;
  adjusting a size of a captured image of the eye;
  adjusting a resolution of an image of the eye; or
  using binarization and morphology to remove the at least one reflection point.

20. The non-transitory computer readable medium of claim 15, wherein the computer readable program code is configured to cause the at least one processor to calculate a vector between a center of a pupil of the eye and a reflection point corresponding to light reflected from an outer surface of a cornea of the eye.

* * * * *